United States Patent
Nawrocke et al.

(10) Patent No.: US 11,216,461 B2
(45) Date of Patent: Jan. 4, 2022

(54) QUERY TRANSFORMATIONS IN A HYBRID MULTI-CLOUD DATABASE ENVIRONMENT PER TARGET QUERY PERFORMANCE

(71) Applicant: Datameer, Inc., San Francisco, CA (US)

(72) Inventors: Kelly Nawrocke, Park City, UT (US); Matt McManus, Waitsfield, VT (US); Martin Nettling, Burgliebenau (DE); Frank Henze, Halle (DE); Raghu Thiagarajan, Cupertino, CA (US)

(73) Assignee: Datameer, Inc, San Francisco, CA (US)

( * ) Notice: Subject to any disclaimer, the term of this patent is extended or adjusted under 35 U.S.C. 154(b) by 166 days.

(21) Appl. No.: 16/542,045

(22) Filed: Aug. 15, 2019

(65) Prior Publication Data
US 2020/0356561 A1 Nov. 12, 2020

Related U.S. Application Data

(60) Provisional application No. 62/845,078, filed on May 8, 2019.

(51) Int. Cl.
*G06F 16/2453* (2019.01)
*G06F 16/22* (2019.01)
(Continued)

(52) U.S. Cl.
CPC .... *G06F 16/24542* (2019.01); *G06F 11/3409* (2013.01); *G06F 16/212* (2019.01);
(Continued)

(58) Field of Classification Search
CPC ........... G06F 16/24542; G06F 16/2455; G06F 16/283; G06F 16/2453; G06F 11/3409;
(Continued)

(56) References Cited

U.S. PATENT DOCUMENTS

| | | |
|---|---|---|
| 5,812,996 A | 9/1998 | Rubin |
| 6,339,769 B1 | 1/2002 | Cochrane |

(Continued)

FOREIGN PATENT DOCUMENTS

WO 2017165914 A1 10/2017

OTHER PUBLICATIONS

Kossmann, The State of the Art in Distributed Query Processing, ACM Computing Surveys, Dec. 2000.

*Primary Examiner* — Dangelino N Gortayo
(74) *Attorney, Agent, or Firm* — David R. Stevens; Stevens Law Group

(57) ABSTRACT

A unified access layer (UAL) and scalable query engine receive queries from various interfaces and executes the queries with respect to non-heterogeneous data management and analytic computing platforms that are sources of record for data they store. Query performance is monitored and used to generate a query performance model. The query performance model may be used to generate alternatives for queries of users or groups of users or to generate policies for achieving a target performance. Performance may be improved by monitoring queries and retrieving catalog data for databases referenced and generating a recommendation model according to them. Duplicative or overlapping sources may be identified based on the monitoring and transformations to improve accuracy and security may be suggested. A recommendation model may be generated based on analysis of queries received through the UAL. Transformations may be performed according to the recommendation model in order to improve performance.

16 Claims, 14 Drawing Sheets

(51) Int. Cl.
  *G06F 16/2455* (2019.01)
  *G06F 16/2458* (2019.01)
  *G06F 16/21* (2019.01)
  *G06N 5/04* (2006.01)
  *G06F 16/25* (2019.01)
  *G06F 16/248* (2019.01)
  *G06F 17/18* (2006.01)
  *G06N 5/00* (2006.01)
  *G06N 20/00* (2019.01)
  *G06F 11/34* (2006.01)

(52) U.S. Cl.
  CPC ........ *G06F 16/217* (2019.01); *G06F 16/2255* (2019.01); *G06F 16/2282* (2019.01); *G06F 16/248* (2019.01); *G06F 16/2456* (2019.01); *G06F 16/2471* (2019.01); *G06F 16/24535* (2019.01); *G06F 16/24539* (2019.01); *G06F 16/24545* (2019.01); *G06F 16/24552* (2019.01); *G06F 16/24556* (2019.01); *G06F 16/24561* (2019.01); *G06F 16/24562* (2019.01); *G06F 16/256* (2019.01); *G06F 17/18* (2013.01); *G06N 5/003* (2013.01); *G06N 5/04* (2013.01); *G06N 20/00* (2019.01)

(58) Field of Classification Search
  CPC ......... G06F 16/24562; G06F 16/24556; G06F 16/2255; G06F 16/2456; G06F 16/24545; G06F 16/212; G06F 16/24535; G06F 16/24561; G06F 16/248; G06F 17/18; G06F 16/2282; G06F 16/24552; G06F 16/256; G06F 16/2471; G06F 16/217; G06F 16/24539; G06F 16/2452; G06F 11/3442; G06F 11/3419; G06F 11/3006; G06N 20/00; G06N 5/003; G06N 5/04; G06N 20/20
  USPC .................................................. 707/713, 757
  See application file for complete search history.

(56) References Cited

U.S. PATENT DOCUMENTS

| | | | |
|---|---|---|---|
| 6,360,324 B2 | 3/2002 | Van Blarkom | |
| 6,470,329 B1 | 10/2002 | Livschitz | |
| 6,609,123 B1 | 8/2003 | Cazemier | |
| 7,475,405 B2 | 1/2009 | Manganaris | |
| 7,657,501 B1 | 2/2010 | Brown | |
| 7,774,363 B2 | 8/2010 | Lim | |
| 8,250,630 B2 | 8/2012 | Mendonca | |
| 8,356,027 B2 | 1/2013 | Jaecksch | |
| 8,595,834 B2 | 11/2013 | Xie | |
| 8,769,684 B2 | 7/2014 | Stolfo | |
| 8,775,413 B2* | 7/2014 | Brown | G06F 16/24542 707/718 |
| 8,826,370 B2 | 9/2014 | Boukobza | |
| 8,930,410 B2 | 1/2015 | Alton | |
| 8,983,985 B2 | 3/2015 | Chen | |
| 9,171,182 B2 | 10/2015 | Shukla | |
| 9,400,879 B2 | 7/2016 | Tredoux | |
| 9,418,384 B1 | 8/2016 | Middleman | |
| 9,536,072 B2 | 1/2017 | Guedalia | |
| 9,621,680 B2 | 4/2017 | D'Costa | |
| 9,633,227 B2 | 4/2017 | Tang | |
| 9,715,528 B2 | 7/2017 | Ho | |
| 9,762,603 B2 | 9/2017 | Grondin et al. | |
| 9,946,780 B2 | 4/2018 | Gerweck | |
| 10,402,589 B1* | 9/2019 | Madisetti | G06F 16/95 |
| 10,909,116 B2* | 2/2021 | Chakra | G06F 16/2379 |
| 10,929,361 B2* | 2/2021 | Gerweck | G06F 16/283 |
| 2002/0095405 A1 | 7/2002 | Fujiwara | |
| 2004/0068559 A1 | 4/2004 | Shaw | |
| 2005/0144176 A1 | 6/2005 | Lei | |
| 2005/0203881 A1 | 9/2005 | Sakamoto | |
| 2005/0256852 A1 | 11/2005 | Mcnall | |
| 2006/0026154 A1 | 2/2006 | Altinel | |
| 2006/0074897 A1 | 4/2006 | Fergusson | |
| 2006/0195416 A1 | 8/2006 | Ewen | |
| 2008/0195577 A1 | 8/2008 | Fan | |
| 2008/0215580 A1 | 9/2008 | Altinel | |
| 2009/0049511 A1 | 2/2009 | Manickam | |
| 2009/0049512 A1 | 2/2009 | Manickam | |
| 2009/0100527 A1 | 4/2009 | Booth | |
| 2009/0234799 A1 | 9/2009 | Betawadkar-Norwood | |
| 2009/0235199 A1 | 9/2009 | Mastie | |
| 2010/0042643 A1 | 2/2010 | Pattabhi | |
| 2012/0059839 A1 | 3/2012 | Andrade | |
| 2012/0197919 A1 | 8/2012 | Chen | |
| 2015/0074117 A1 | 3/2015 | Gorelik et al. | |
| 2015/0169686 A1* | 6/2015 | Elias | G06F 16/24542 707/718 |
| 2015/0248462 A1 | 9/2015 | Theeten | |
| 2015/0341240 A1* | 11/2015 | Lyoob | G06Q 40/00 709/201 |
| 2016/0034530 A1 | 2/2016 | Nguyen et al. | |
| 2016/0048408 A1 | 2/2016 | Madhu et al. | |
| 2016/0117524 A1 | 4/2016 | Padmanabhan | |
| 2016/0140205 A1 | 5/2016 | Hsu et al. | |
| 2016/0335318 A1 | 11/2016 | Gerweck | |
| 2017/0031944 A1 | 2/2017 | Faerber et al. | |
| 2017/0124131 A1 | 5/2017 | Mack | |
| 2017/0213257 A1 | 7/2017 | Murugesan et al. | |
| 2017/0316007 A1 | 11/2017 | Vandenberg et al. | |
| 2018/0025052 A1* | 1/2018 | Nambiar | G06F 16/2453 707/713 |
| 2019/0026322 A1 | 1/2019 | Gerweck | |
| 2019/0026335 A1 | 1/2019 | Gerweck | |
| 2019/0266534 A1* | 8/2019 | Kessaci | G06F 9/45558 |

* cited by examiner

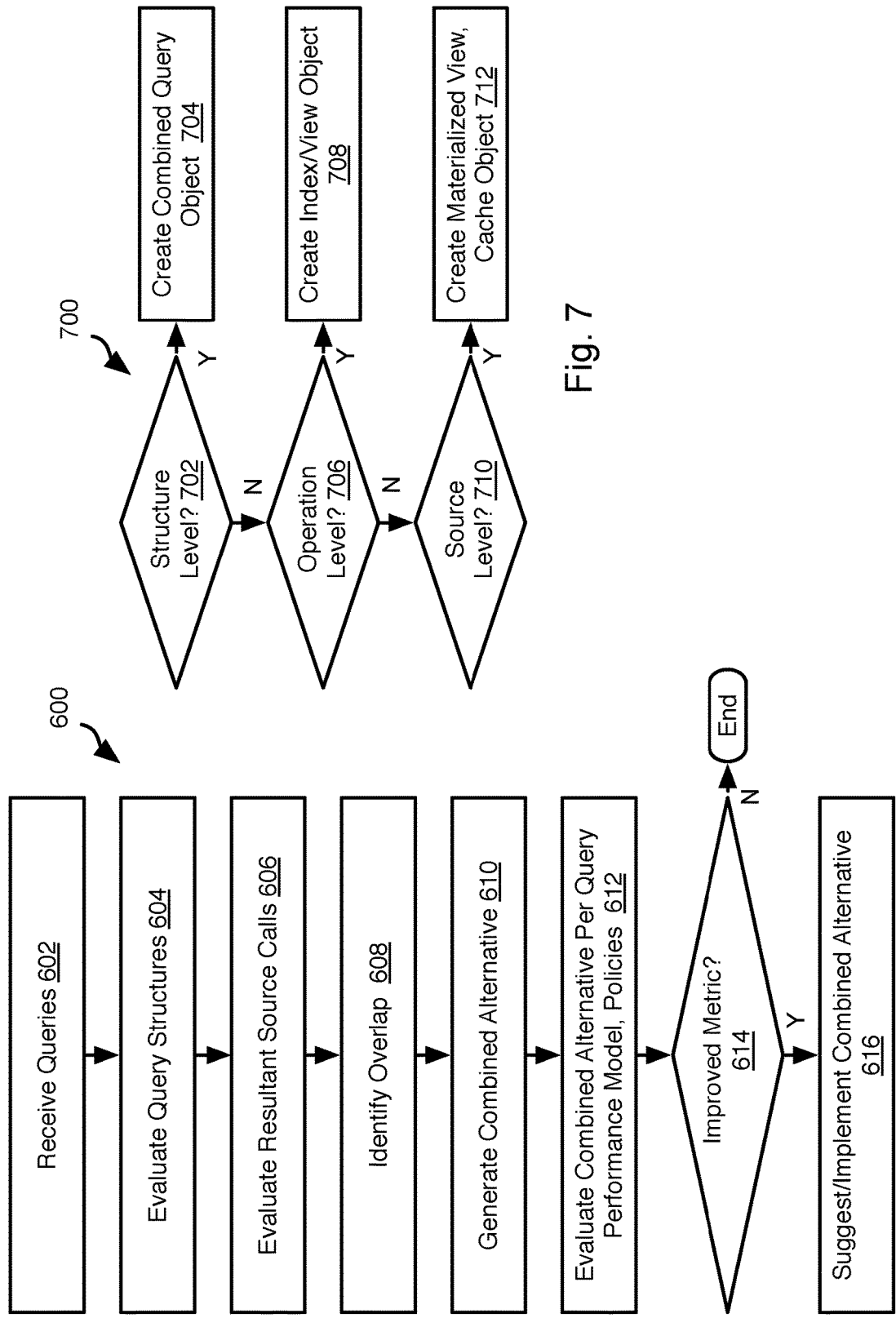

QUERY TRANSFORMATIONS IN A HYBRID MULTI-CLOUD DATABASE ENVIRONMENT PER TARGET QUERY PERFORMANCE

RELATED APPLICATIONS

This application claims the benefit of U.S. Provisional Application Ser. No. 62/845,078 filed May 8, 2019 and entitled MANAGING DATABASE QUERY EXECUTION IN A HYBRID MULTI-CLOUD DATABASE ENVIRONMENT, which is hereby incorporated herein by reference in its entirety.

BACKGROUND

Many database implementations exist, such as ORACLE, SQL, MYSQL, IBM DB2, SNOWFLAKE and many others. Likewise, there are many computing platforms that may store a database, such as a cloud storage platform: AMAZON WEB SERVICES (AWS), MICROSOFT AZURE, GOOGLE CLOUD, or the like. An enterprise may also have its own computing platform for storing and accessing a database. Data of an organization may be implemented using multiple database implementations on multiple computing platforms. It would be an advancement in the art to improve the function and performance in such a heterogeneous database environment.

BRIEF DESCRIPTION OF THE FIGURES

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which:

FIG. 6 is a process flow diagram of a method for suggesting combinations and alternative processing for queries in accordance with an embodiment of the present invention;

FIG. 7 is a process flow diagram of a method for generating combined alternatives to queries at different levels in accordance with an embodiment of the present invention;

DETAILED DESCRIPTION

Figure 1:
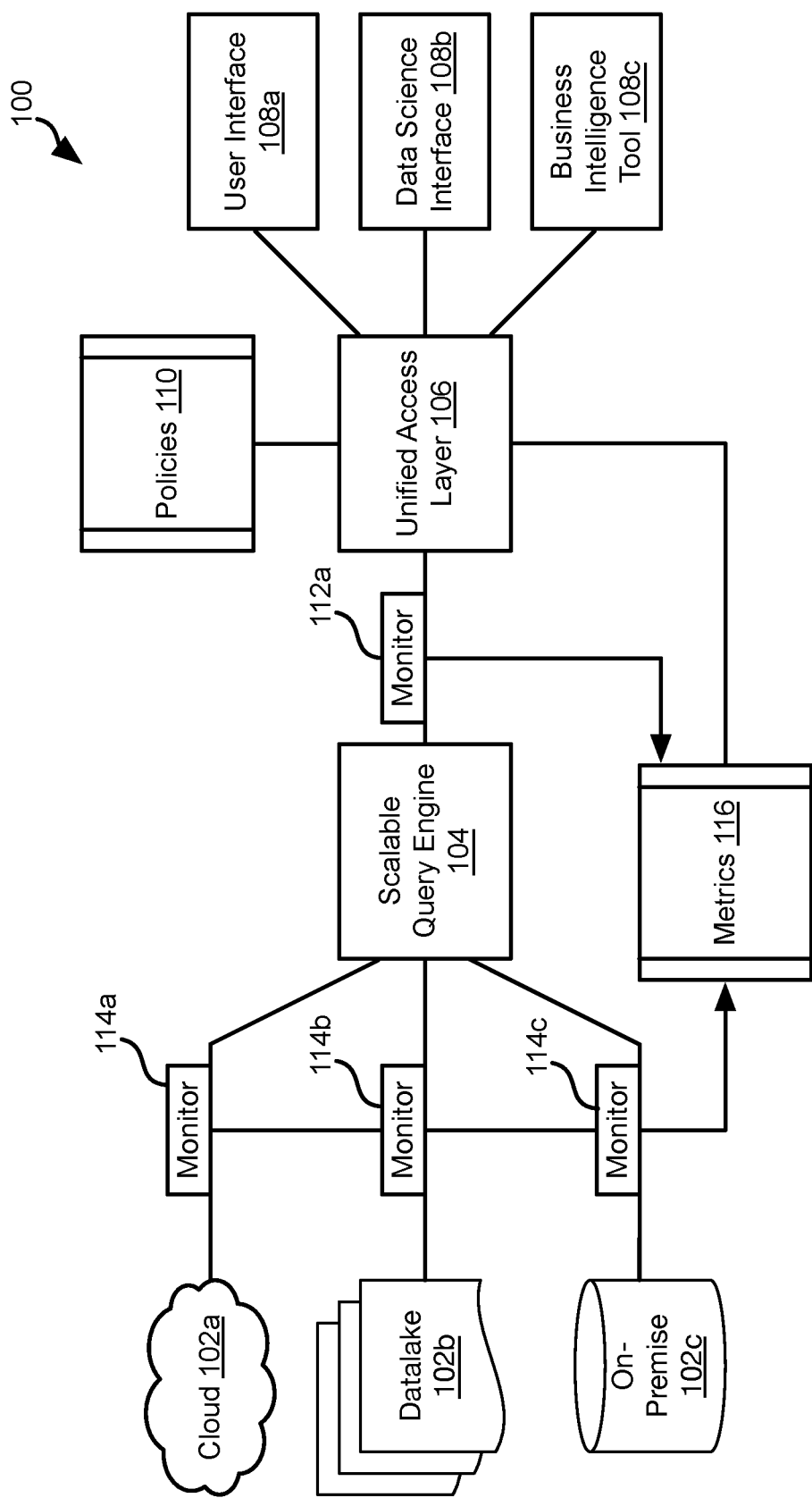
FIG. 1 is a schematic block diagram of an environment in which methods may be practiced in accordance with an embodiment of the present invention.

It will be readily understood that the components of the invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Embodiments in accordance with the invention may be embodied as an apparatus, method, or computer program product. Accordingly, the invention may take the form of an entirely hardware embodiment, an entirely software embodiment (including firmware, resident software, micro-code, etc.), or an embodiment combining software and hardware aspects that may all generally be referred to herein as a "module" or "system." Furthermore, the invention may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. In selected embodiments, a computer-readable medium may comprise any non-transitory medium that can contain, store, communicate, propagate, or transport the program for use by or in connection with the instruction execution system, apparatus, or device.

Computer program code for carrying out operations of the invention may be written in any combination of one or more programming languages, including an object-oriented programming language such as Java, Smalltalk, C++, or the like and conventional procedural programming languages, such as the "C" programming language or similar programming languages, and may also use descriptive or markup languages such as HTML, XML, JSON, and the like. The program code may execute entirely on a computer system as a stand-alone software package, on a stand-alone hardware unit, partly on a remote computer spaced some distance from the computer, or entirely on a remote computer or server. In the latter scenario, the remote computer may be connected to the computer through any type of network, including a local area network (LAN) or a wide area network (WAN), or the connection may be made to an external computer (for example, through the Internet using an Internet Service Provider).

The invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions or code. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transitory computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, the methods disclosed in this application may be practiced in a database environment 100 having some or all of the illustrated components. In particular, the database environment may include databases implemented on multiple computing platforms 102a-102c, such as a first cloud computing platform 102a (AMAZON WEB SERVICES (AWS), MICROSOFT AZURE, GOOGLE CLOUD, etc.); a datalake 102b implemented on a second cloud computing platform, on-premise computing equipment, or other computing platform; and an on-premise computing platform 102c. The computing platform 102a-102c may have various capabilities, capacities, performances, and costs (monetary or computing) associated therewith. For example, some computing platforms 102a-102c may provide only basic database functions such as retrieval of data referenced in a request. Others may provide database computations such as table joins, aggregations, or other complex computations.

In particular, a cloud computing platform 102a may provide both storage and computational resources that may store a database, implement data access, and perform arbitrary computations with respect to a database.

A datalake 102b may be embodied as a distributed file system storing disparate datasets in multiple formats. The datalake 102b may store data in various storage structures such as relational, object, non-relational, text, hierarchical, and the like. A datalake 102b may also provide some parallel computation facilities e.g., MapReduce, Impala, Spark SQL, Hive LLAP, or the like. Datalakes 102b may have varying processing capabilities and latencies. The datasets of a datalake 102b are typically large with limited pre-defined meta-data structures defining the datasets. The computing equipment implementing a datalake 102b may be on-premise or in a cloud computing platform 102a. The engine 104 may be programmed to interface with the datalake 102b and to process data in various formats stored in the datalake 102b.

An on-premise computing platform 102c may be a computing platform in which database software executes on computing hardware typically without a virtualization layer such as would be present in a cloud computing platform 102a.

Each of the computing platforms 102a-102c may implement databases according to various different implementations such as ORACLE, SQL, MYSQL, IBM DB2, SNOWFLAKE, or the like. The databases implemented may also include non-relational storage systems, such as S3, Hbase, and the like. The databases implemented by some or all of the computing platforms 102a-102c may be sources of record for the data stored thereon and therefore store the current and authoritative copies of the data stored thereon.

In the illustrated embodiment, access to the various computing platforms is performed through a scalable query engine 104 ("engine 104") that implements interfaces to the various computing platforms 102a-102c and database implementations implemented on the computing platforms 102a-102c. The engine 104 may further interface with the cloud computing platforms to scale out and scale in computing resources allocated to storage of a database or computation with respect to a database. The engine 104 may do so by being programmed to use an application programming interface (API) or other interface exposed by a computing platform 102a-102c or database implementation along with programming to monitor usage and perform scaling out and scaling in based on usage.

The environment 100 may further include a unified access layer 106. The unified access layer 106 may provide an access point by which disparate user computing devices and users may access the engine 104. In particular, there are many different types of applications that consume database services for different purposes. Accordingly, the unified access layer 106 may be programmed to interface with such applications using APIs exposed by these applications. In this manner, access by multiple applications across an enterprise may be monitored and evaluated according to the methods disclosed herein in order to improve and/or manage performance of query processing.

The unified access layer 106 may receive queries and provide response to queries to a user interface 108a that may be a general purpose interface for receiving database queries, providing responses to database queries, and for presenting suggestions and representations of objects generated according to the methods disclosed herein as well as receiving user responses to these suggestions and objects. The user interface 108a may implement individual user accounts or dashboards that enables each user to create unique views of the databases implemented by the computing platforms 102a-102c. However, as described in detail below, activities of multiple users may be aggregated in order to improve performance of queries and to automate generating of views that are of interest to a team of users as discussed below.

The unified access layer 106 may further interface with a data science interface 108b (e.g., notebook application) for running experiments and making inferences with respect to large amounts of data. The unified access layer 106 may further interface with a business intelligence tool 108c that performs queries in order to obtain performance indicators, reports, or other information from data describing operation of an enterprise or a target market.

The unified access layer 106 may further access and implement policies 110 with respect to queries from the interfaces 108a-108c. These policies 110 may be identity based: certain users or organizations are permitted to access certain databases or tables within databases. These policies 110 may be resource based: certain users or organizations are permitted to user a certain amount of a particular resource such as storage space or computing time of a particular computing platform 102a-102c. These policies may be money based: operations by a certain user or organization may be permitted to perform queries from an external computing platform 102a-102b that cost up to a specified budget in a specified time period (e.g., month). The policies 110 may further manage priorities, e.g. within a certain time period some users, organizations, projects (e.g., specific data spaces), or types of queries may be given higher priority than others in order to provide a desired quality of service (QoS) to customers. In another example, one interface 108a-108c may be given a higher priority than another in the policies 110.

Policies 110 may also be capability based, i.e. certain computing platforms 102a-102c are capable of performing certain operations. For example, policies 110 may indicate which of the following a computing platform 102a-102c is capable of performing: execute a project, filter on a read, process a full query, implement parallel computation (e.g., MYSQL v. SNOWFLAKE). Other capabilities may also include ability to create remote tables and the ability to create remote materialized views.

Policies 110 may be scale based, i.e. indicate an amount of data that may be stored or processed by a computing platform 102a-102c, an amount of computation per unit time that may be performed by a computing platform 102a-102c or some other representation of the computing capacity of the computing platform 102a-102c.

Policies may specify scheduling availability and constraints for a computing platform 102a-102c, e.g. an amount of resources available for queries of a user, organization, or interface 108a-108c that may be scheduled to execute within a given time period. For example, this may include definitions of blackout periods, busy periods, or low usage periods for a particular computing platform 102a-102c. Policies 110 may include a user-specified preference among sources 102a-102c, such as a preferred cloud storage provider 102a, a preferred cloud data base provider (SNOWFLAKE, REDSHIFT, etc.), or the like, for pushing computation to according to the methods described herein.

Data regarding performance of query execution may be gathered and used according to the methods disclosed herein. For example, a monitoring module 112a may detect both a query output by the unified access layer 106 and a response to that query thereby enabling the monitoring module 112a to detect overall latency of a query and its response.

Monitoring modules 114a-114c may likewise each detect a query to a computing platform 102a-102c and its response and use this to determine its latency. Monitoring modules 114a-114c may monitor other aspects of a query, such as an amount of computing time used by the computing platform 102a-102c to process the query. For example, such a metric may be reported by the computing platform 102a-102c with the response to the query.

Monitoring modules 114a-114c may monitor any aspect of resource consumption by a query such as bandwidth consumption. This may include network capacity consumed transmitting data between the scalable query engine 104 and a source 102a-102c as part of processing of a query. Likewise, parallel processing of a query may result in data transfer locally within a particular sources 102a-102c. Accordingly, amounts of data transfer within a particular source resulting from a query may also be monitored and reported to the monitoring modules 114a-114c. In some implementations, network bandwidth is purchased such that bandwidth consumption may be transformed to a monetary cost according to the cost per unit of data transmitted.

In some embodiments, a source 102a-102c may record an amount of disk usage (amount of data written to and read from one or more disks) resulting from a query and report this to the monitoring modules 114a-114c.

Monitoring modules 112, 114a-114c may further record other aspects of queries in addition to latency and resource consumption. For example, some or all of the following metrics may be recorded for a query:
    Timing (when received)
    Complexity (e.g., type and number of computations)
    Object usage (tables, views, remote calls, etc. referenced in the query or performed in response to the query)

Monitoring modules 112, 114a-114c may further capture data describing data accessed by queries. Such data may include data demographics of data accessed, such as:
    Record and column of a database referenced by a query
    Data volume of a query (record count, byte sizing, column count, etc.)
    Distributions (histograms of one or more columns of tables, cardinality)
    Domains (column type and range information)
    Whether data is continuous or categorical
    Statistics (min, max, mean, etc.)
    Schema information (may be part of domain)
    Temporal information (how often data is updated, how often should the system update it (e.g., in a cache))

Data from the monitoring modules 112, 114a-114c may be stored as metrics 116 and used according to the methods described herein. Some or all of the metrics from the monitoring modules 112, 114a-114c as described above may be used for billing purposes, i.e. to determine resources consumed by a user in order to determine an amount owed by the use.

The metrics 116 may also be used for capacity planning and reporting. For example, the scalable query engine 104 may suggest acquiring of additional computation or storage resources on a cloud computing platform 102*a* in response to the usage information. The scalable query engine 104 may expand storage and computation resources allocated to the scalable query engine 104 in response to usage data. Usage data may also be summarized and reported to an administrator of a system for planning or other business purposes. The metrics 116 may also be used to evaluate usage with respect to constraints on the resources reported by the metrics. In particular, there may be constraints on network bandwidth between the scalable query engine 104 and a source 102*a*-102*c*. Accordingly, in response to detecting consumption of bandwidth as reported in the metrics on a particular connection to a source 102*a*-102*c* reaching a capacity of the connection, additional transmission of queries over the connection may be paused or throttled. Likewise, in response to consumption of computation resources on a source 102*a*-102*c* approaching a limit on such resources, the processing of queries on that source 102*a*-102*c* may be paused or throttled.

As is apparent from the above description, the environment 100 is a hybrid multi-cloud database environment 100. In particular, the environment 100 includes non-heterogeneous data management and analytic computing platforms 102*a*-102*c* (silos) as sources. In contrast, the scalable query engine 104 and unified access layer 106 that perform methods disclosed herein are not sources of record and manage the caching, movement, and accessing of data on the various computing platforms 102*a*-102*c* and performs, or invokes performing of, computation against data managed by other source systems of record As described, below, the unified access layer 106 provides a unified, personalized views of databases in the systems of records and facilitates analytics data access and collaboration between individuals and teams. Various approaches are described below. In particular, approaches are described for monitoring the entire set of resources on platforms 102*a*-102*c* and improving their utilization from an individual user's perspective. Approaches are further described for facilitating and accelerating implementation and execution of analytics and data science workloads.

The unified access layer 106 and scalable query engine 104 ("the virtualization platform") may be used to perform methods described herein. In particular, the virtualization platform may be used to create a virtualized access layer for individuals and small teams to collaboratively create personalized perspectives of data assets in any size enterprise (See FIGS. 6-10 and corresponding description). The virtualization platform need not be, and in many instances will not be, an enterprise's data system of record but works with data management systems of record (e.g., 102*a*-102*c*) irrespective of where the data management system resides. Data assets on these systems of record 102*a*-102*c* can be accessed and personalized regardless of where they reside including a cloud computing platform 102*a*, multiple cloud computing platforms 102*a*, or a combination of premise computing equipment 102*c* and one or more cloud computing platforms 102*a*. The virtualization platform may virtualize access to a wide variety of data management systems implemented on any of these computing platforms 102*a*-102*c* that may include some or all of on-premise data warehouses, cloud data warehouses, document databases, relational databases, distributed and non-distributed file systems as well as object stores.

Figure 11:
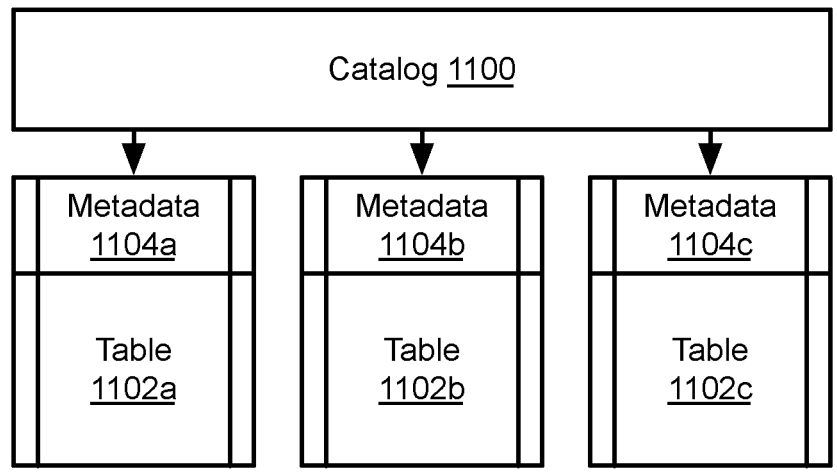
FIG. 11 is a diagram of data structures of a database in accordance with the prior art.

With many data management systems, the virtualization platform will automatically interrogate and integrate with the target systems catalog, and management interfaces (see discussion of FIGS. 11 and 12, below). In addition to virtualized access, the virtualization platform may provide computational elasticity, workload management, and many performances enhancing and optimizing techniques (see discussion of FIGS. 13 and 14, below). The virtualization platform may also integrate into an existing enterprise eco-system. The virtualization platform may also integrate into common security layers of various data management systems that may be implemented on the computing platforms 102*a*-102*c*. The virtualization platform may also account for different security of computing platforms 102*a*-102*c* as recorded in the policies 110, e.g., prevent data from a source being cached on another source lacking appropriate data protections. The virtualization platform may also integrate with common collaboration applications and project management tools.

The virtualization platform may adapt and make intelligent choices. For example, it may work to migrate workloads onto an available platform based on user criteria with respect to capability, time, cost, available resources, and service level agreements (see discussion of FIGS. 16-18, below). In addition to choosing a computing platform 102*a*-102*c* from a computational perspective, the virtualization platform may infer information with respect to data relationships, usage patterns, lineage, etc. of received queries. These inferences allow the virtualization platform to assist the process of identifying and personalizing by means of suggestions (or enactment) of alternative usage patterns, optimizations, and sources (see discussion of FIGS. 6-9 and FIGS. 13 and 14, below).

Figure 2:
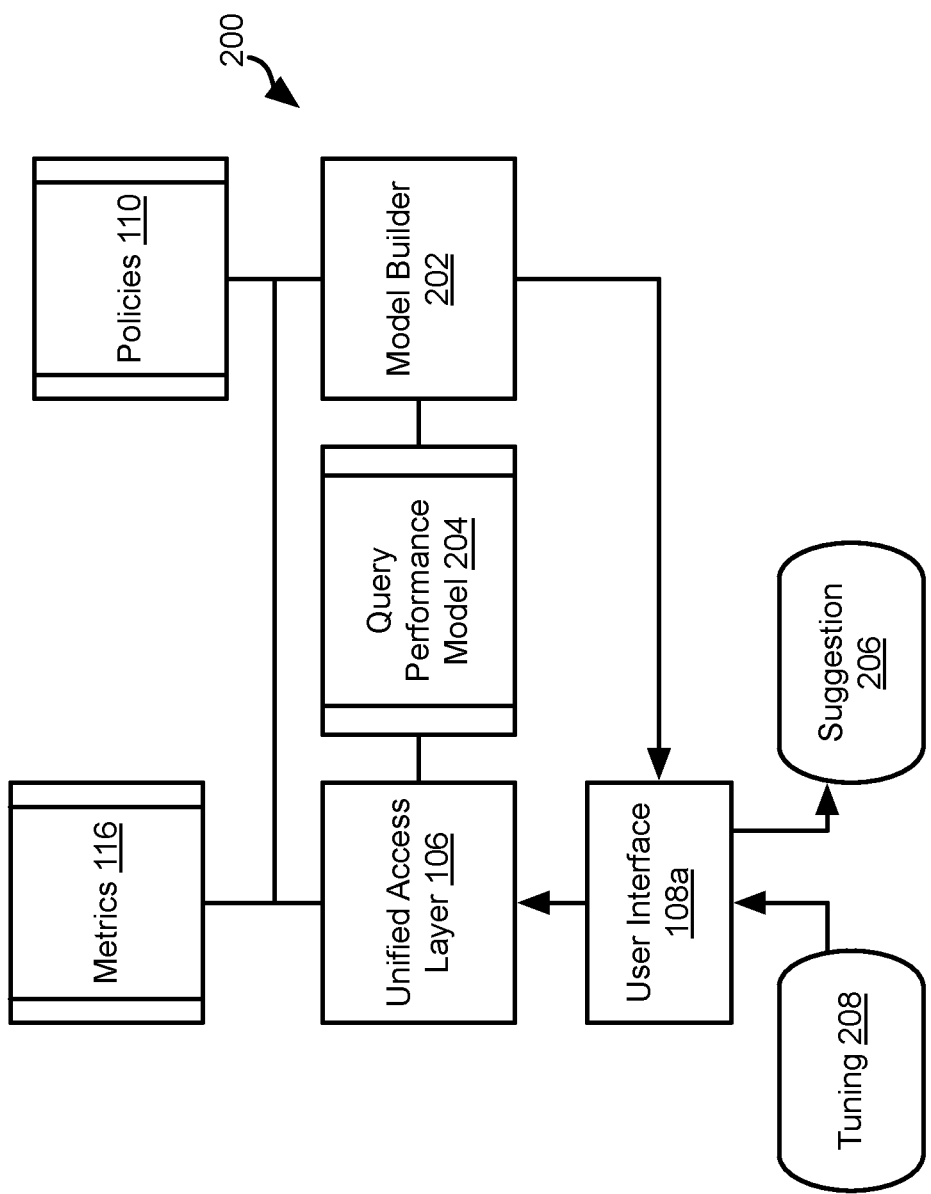
FIG. 2 is a schematic block diagram of a system for generating and using a query performance model.

FIG. 2 illustrates a system 200 for using metrics 116 gathered as described above. In particular, the metrics 116 and policies 110 may be processed by a model builder 202 in order to generate a query performance model 204. The system 200 may be implemented on one or more computing devices implementing the engine 104 and unified access layer 106. The query performance model 204 relates attributes of a query to its performance in terms of latency, computing resources consumed (memory used, processor time/cycles used, amount of data transmitted over a network), and possibly monetary cost on a given computing platform). Attributes of a query may include a data volume referenced (e.g., size of tables referenced by the query) and complexity (number and types of computations included in the query such as aggregations).

Note that there may be many metrics for the same query. In particular, a query from an interface 108*a*-108*c* has its attributes and its overall performance in terms of total latency, total computing resources consumed, and possibly a total monetary cost. That same query may result in multiple sub-queries to multiple computing platforms 102*a*-102*c*, each sub-query having metrics relating its own attributes to latency, consumed computing resources, and possibly a monetary cost.

Accordingly, the model builder 202 may include a machine learning model or other algorithm that generate one or more models relating the attributes of a query to one or more metrics of performance (latency, computing resource, monetary cost). For example, there may be an overall model obtained by evaluating the overall metrics of queries. There may be individual models for each computing platform 102*a*-102*c* computed for queries and corresponding metrics for the each computing platform 102*a*-102*c*. The model builder 202 may operate "offline," such as at off-peak times or on a different computing resource than the unified access layer in order to avoid impacting production processing of queries.

The model builder 202 or some other module may use the query performance model 204 to generate suggestions 206 that may be presented to a user by way of the user interface 108. Suggestions 206 may be filtered according to the policies 110 that may limit which suggestions are permitted to be implemented. As discussed in detail below with respect to FIGS. 3 through 5B, the suggestions 206 may indicate ways to improve an aspect of the performance (latency, computation resources, monetary cost) of a query based on the query performance model 204. The user interface 108a may further include tuning parameters 208 from the user in response to the suggestions that modify one or more aspects of processing of a query in order to improve an aspect of performance as described below with respect to FIGS. 3 through 5B. Note also that tuning 208 based on the query performance model 204 may also be performed according to the approach described below with respect to FIGS. 16 through 18.

Figure 3A:
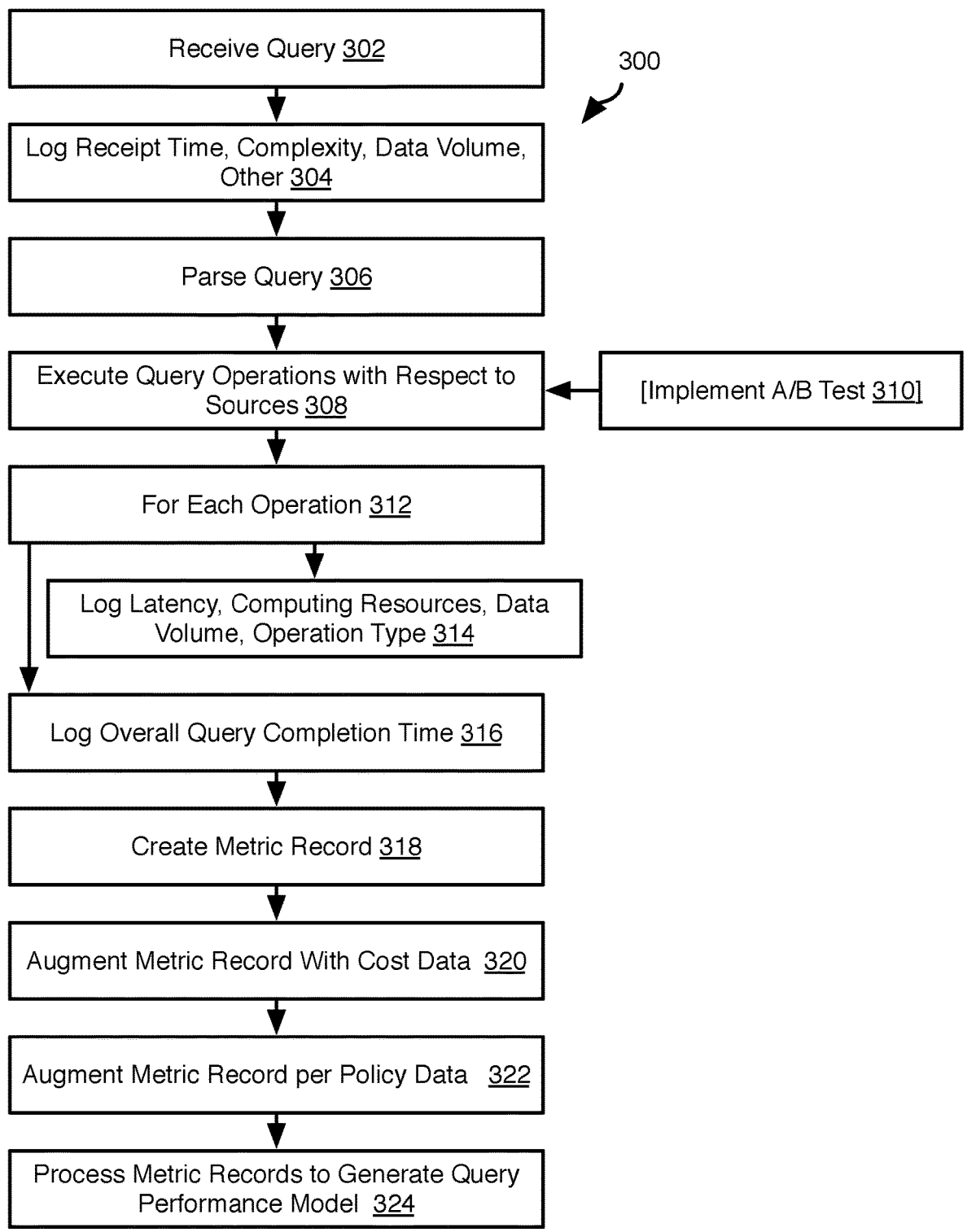
FIG. 3A is a process flow diagram of a method for generating a query performance model in accordance with an embodiment of the present invention.

FIG. 3A illustrates a method 300 that may be executed in the database environment 100 using the system 200. The method 300 may include receiving 302 a query by the unified access layer 106 from an interface 108a-108c. One or more attributes of the query may be logged 304, such as time of receipt, a metric of complexity (number of computations, computational complexity of individual computations), a volume of data (size of table, number of rows, number of columns, etc.) referenced by the query, or other attribute of the query.

The query may then be parsed 306 into individual data access and computation operations and these operations may be executed 308 with respect to sources of data on one or more of the computing platforms 102a-102c. In particular, a computing platform 102a-102c may host a database that is the source of record for data referenced by the query. Note that step 308 may be performed according to an A/B test 310. As will be described below, various approaches may be used to perform data access and computation. In particular, data access may include retrieving ("fetching") and caching data from a remote computing platform 102a-102b on a premise computing platform 102a. Alternatively, data access may be performed without caching. Likewise, a computation with respect to data may be performed on the premise computing platform 102c or may be moved ("pushed") to a cloud computing platform 102a-102b that stores the data with respect to which the computation is being performed. Accordingly, a computation of a query may be pushed to a source or data for a query may be fetched from a source based on its attributes according to an A/B experimental plan such that the performance metrics for queries having various attributes may be determined for each data access and computation type.

The method 300 may include performing 312 for each operation from step 308, logging 314 one or more values such as latency, computing resources consumed, data volume, operation type (data access, join, aggregation operation, etc.), or the like. Latency for an operation may include an elapsed time between transmitting of a query to a source 102a-102c and receiving a response to the query, e.g. the engine 104 acknowledges completion of the query to the source 102a-102c.

The method 300 may further include logging 316 a time of completion of the query received at step 302, e.g. a time at which all of the operations from step 306 are executed 308 and an overall response to the query is returned to the unified access layer 106. Other metrics described above (see description of monitoring modules 112, 114a-114c) that are captured for a query may be collected at step 316.

The method 300 may include creating 318 records in the metrics 116 for the data logged at steps 314 and 316. For an overall query, the record may include attributes of the query from step 304, the latency from step 316, and computing resources that are an aggregation of the computing resources logged 314 for the individual operations of the query. For an operation, the record may include the attributes of the operation, latency, and computation resources consumed as logged at step 314 for the operation.

In some embodiments, the records of step 318 may be augmented 320, 322 with additional data either before or after creation 318. For example, a monetary cost of an operation may be computed based on consumed computing resources and a known cost function. This monetary cost may be added 320 to the record of the operation and the aggregate monetary cost of operations of an overall query may be added 320 to the record of the overall query.

In some embodiments, the policy data 110 may impose additional cost on an operation. For example, a peak time period may be defined in which the cost of operations is artificially inflated in order to bias operations toward execution outside of the peak time period or to penalize operations that are of lower priority. For example, for a particular source 102a-102c records of operations during the peak time period may be assigned 322 an additional "cost" value based on computational resources consumed and independent of monetary cost that will be used to train the model builder 202 to balance usage of that source 102a-102c during the peak time period.

The method 300 may then include processing 324 the metric records by the model builder 202 in order to create the query performance model 204. As noted above, this may include creating an overall model and models for individual computing platforms 102a-102c that relate attributes of a query to one or more performance metrics (latency, computational resources, monetary cost). Step 324 may include using any statistical algorithm, machine learning algorithm, or artificial intelligence algorithm (e.g., neural network, deep neural network, convolution neural network, etc.) known in the art. In particular, each record may be viewed as an item of training data including the query attributes as an input and the performance metrics as desired outputs. The machine learning algorithm may then be trained to produce the desired output for a given input according to any approach known in the art.

Figure 3B:
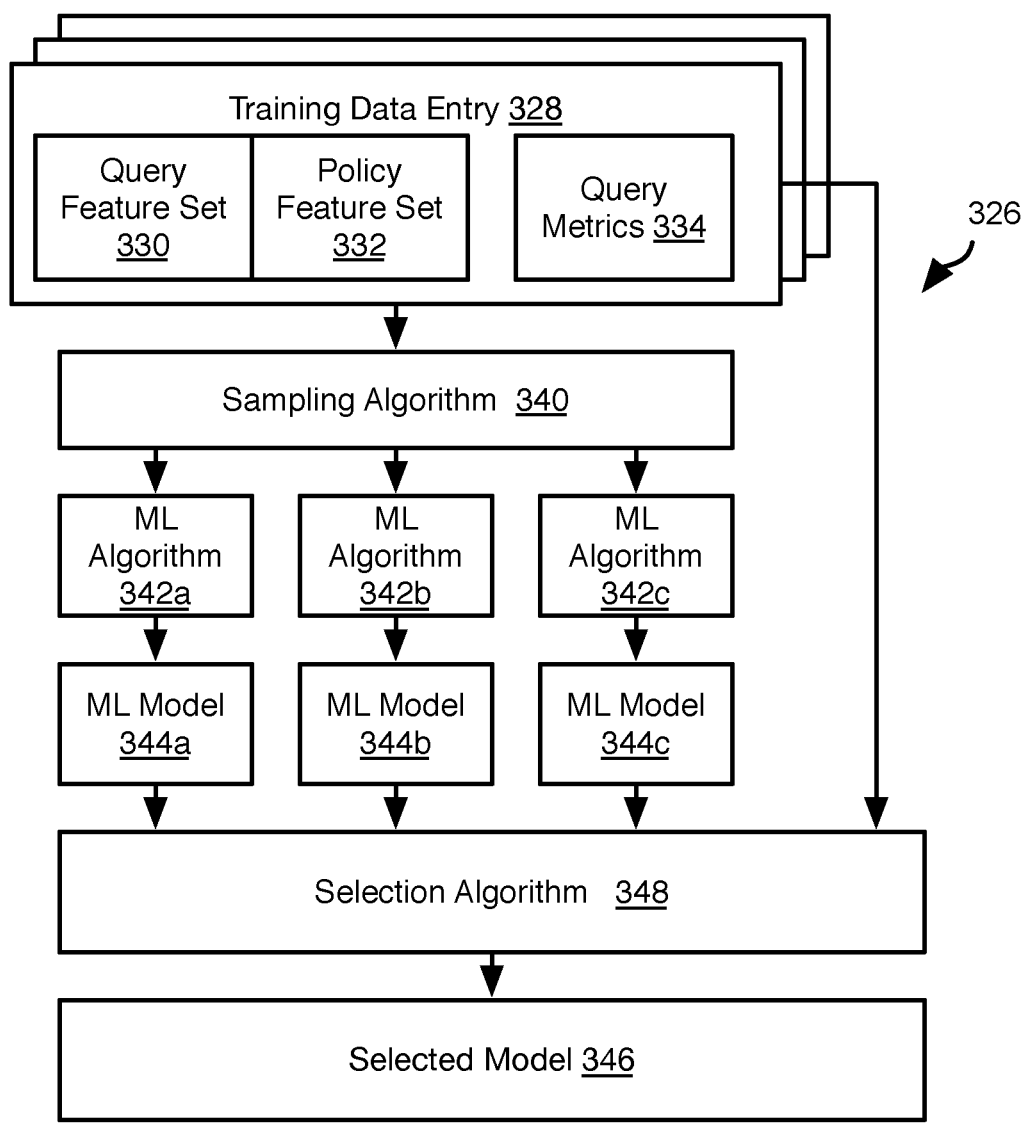
FIG. 3B is a block diagram illustrating a machine learning approach to generating a query performance model in accordance with an embodiment of the present invention.

FIG. 3B illustrates an example approach 326 for generating 324 the query performance model 204 using machine learning. Training data entries 328 may be generated using the data assembled as described above with respect to FIG. 3A. For example, each entry 328 may correspond to a query. For a query a query feature set 330 may be assembled that includes features such as volume of data referenced by the query, the metric of query complexity, which interface 108a-108c generated the query, which computing platform 102a-102c performed an operation in the query, whether data referenced by the query was cached and where it was cached, whether computation was pushed to a particular computing platform 102a-102c, or other attributes of the query. The training data entry 328 may further include policy feature set 332 that includes data describing policies in effect when the query was executed, such as the policy data added at step 322. For example, some or all of the computing platforms 102a-102c that are used to execute the query may have policies that reflect resource limitations (computing time, memory, data volume) that are either artificially imposed or reflect physical limits of available computing and storage hardware. Accordingly, these policies may affect the latency or other metric of performance of the query and may be included in the training data entry 328.

The training data entry 328 may include the query metrics 334 or data derived from the query metrics 334, e.g. the metrics obtained for the query at some or all of step 314, 316, and 320. Accordingly, the feature sets 330, 332 become the input for the entry 328 and the query metrics 334 are a desired output that the machine learning model is trained to produce.

In some embodiments, training a machine learning model according to the training data entries 328 may include training multiple machine learning models. For example, training data entries 328 may be divided into sets of entries by a sampling algorithm 340. The sampling algorithm may be any sampling algorithm known in the art.

Each set of entries may then be trained by a machine learning algorithm 342a-342c. The result of this is a set of machine learning models 344a-344c that are each trained to predict query metrics 334 based on input feature sets 330, 332 for the set of training data entries 328 that were used to train it.

One of the models 344a-344c or a combination thereof may be selected as a selected model 346. Specifically, a given input query feature set and policy feature set of a query may be input to the models 344a-344c each of which outputs a prediction for one or more corresponding query metrics that would result from the query feature set and policy feature set. A selection algorithm 348 may be used to either (a) identify a most accurate of the models 344a-344c as the selected model 346 or (b) generate a model 346 for selecting among the models 344a-344c for given input feature sets 330, 332.

Where (a) is implemented, selecting the most accurate model 344a-344c may include processing a set of data entries that is different from the sets of entries used to train the models 344a-344c ("the validation set"). The model 344a-344c with the most accurate predictions (corresponding most closely to the actual metrics 334 of the validation set) may then be selected as the selected model 346. Alternatively, multiple models 344a-344c may be selected for use in combination. For example, an average or weighted average of multiple models 344a-344c. Other aggregations are possible, e.g. selection of the output of the multiple models 344a-344c that is most frequent among the outputs of the multiple models for a given input.

Where (b) is implemented, following training of the models 344a-344c, the machine learning algorithm 348 may train the model 346. Training entries for the machine learning algorithm 348 may each include outputs of the models 344a-344c for a query feature set 330 and policy feature set 332 of a query as inputs and the query metrics 334 for that query as a desired output. Note that same or different training data entries 328 may be used for training the selection model 346 as were used to train the models 344a-344c. The model 346 therefore is used to select among outputs of the models 344a-344c in production.

The machine learning models 344a-344c and model 346 may be embodied as any machine learning algorithm known in the art such as decision tree, clustering, Bayesian network, genetic, deep neural network, convolution neural network, or the like.

Note that FIG. 3B is exemplary only and other approaches may be used. In particular, FIG. 3B illustrates an example of boosting in order to improve the performance of a machine learning algorithm. However, any boosting algorithm known in the art may be used. In some embodiments, rather than clustering training data entries 328 to obtain the models 344a-344c, the models 344a-344c are models with different configurations for hyper parameters that are each separately trained with the selection model 346 being trained to select or combine the outputs of the models 344a-344c as described above.

Figure 5A:
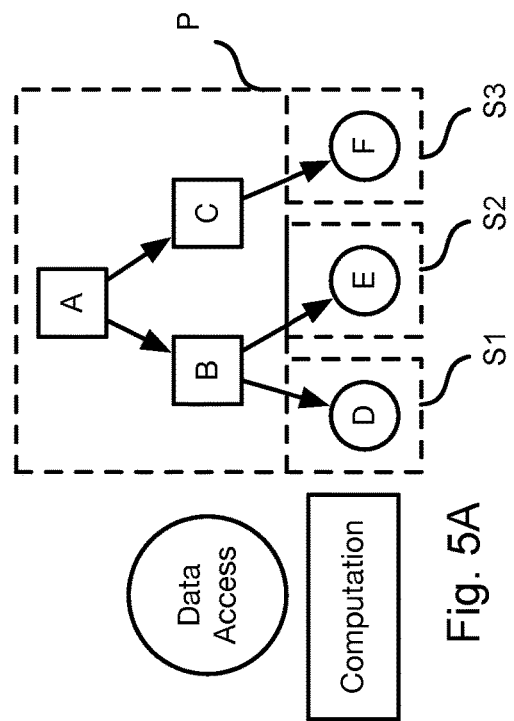
FIGS. 5A and 5B are diagrams illustrating different scenarios for processing a query in accordance with an embodiment of the present invention.
Figure 5B:
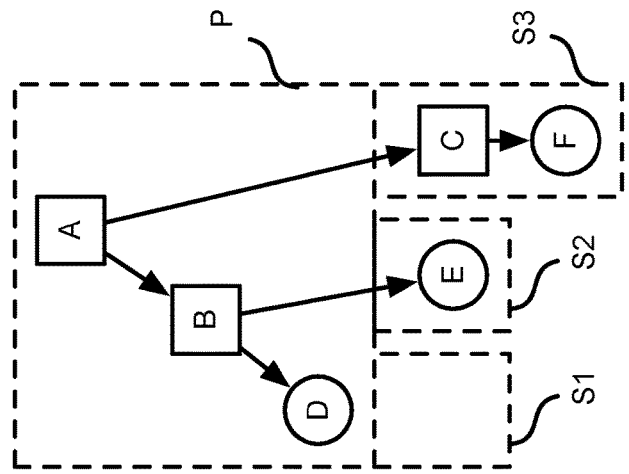
Figure 4:
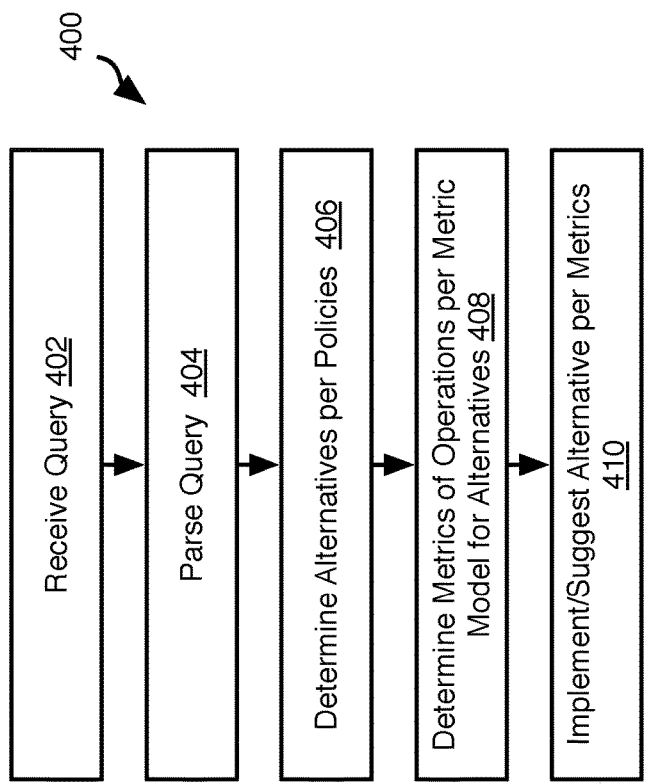
FIG. 4 is a process flow diagram of a method for using a query performance model in accordance with an embodiment of the present invention.

FIG. 4 and FIGS. 5A and 5B illustrate a method 400 for using a query performance model 204 to process individual queries. In particular, FIGS. 5A and 5B illustrate various query plans illustrating where data access and computation may be performed for a query having a given query model. The method 400 may include receiving 402 a query and parsing 404 the query into individual operations (data access and computation) that constitute the query model of the query. This is shown in FIG. 5A, which shows a query composed of computational operation A that operates with respect to the results of computational operations B and C. Operation B processes results of a data access D with respect to a data source S1 and a data access E with respect to a data source S2. Operation C processes result of a data access F with respect to a data source S3. In this example, computations A, B, and C are performed by a local computing platform P. Computations may include some or all of joins, sub-queries, groupings, aggregations, or other database computations.

In this example, sources S1 and S3 may be remote from the local computing platform P. The sources S1-S3 and local computing platform P may be embodied as any of the computing platforms 102a-102c. This is just an example, and operations may be arranged in a hierarchy of any number of levels with respect to any number of data accesses. Local computing platform P may be any of the computing platform 102a-102c that is executing one or both of the engine 104 and unified access layer 106. Sources S1-S3 refer to sources of record for databases or other types of data that are on a different computing platform 102a-102c than the local computing platform P such that decisions may be made regarding pushing of computation to the source S1-S3 and fetching of data from the source S1-S3 to the local computing platform P as described below.

The method 400 may include identifying 406 possible alternative sources for performing each operation. For example, FIG. 5A shows one set of alternatives with computation being performed on the premise P and data accesses being performed on the sources S1-S3 storing the data being accessed. FIG. 5B shows other alternatives. For example, data access D may be performed by first caching the data on the premise P. A computation B with respect to data from data access E of data on source S2 may be performed with computation on premise P with data access remaining on the source S2. Computation C with respect to data on source S3 may be shifted to source S3 such that the computation C and the data access F for data processed according to computation C are all performed on the source S3. In another scenario, data may be transferred from a first source to a cache on a second source (e.g., S2 to S3) that is not the source of record for the data such that one or both of computation and data access are performed on the second source.

Possible alternatives may be filtered with respect to policies 110. In particular, some data may be prohibited from being cached on local computing platform P or on a different source than its current source due to privacy or other concerns. Some sources S1-S3 may have limited computational capacity and may be used only for data access. Some sources S1-S3 may be unavailable for performing computation at peak times. Any other policy may limit possible alternatives as determined by a human operator or limitations of a particular source S1-S3. In some embodiments, alternatives and their predicted metrics (see step 408) are determined without first filtering. Accordingly, where an alternative has high performance relative to others (e.g., highest performance or top N highest performance where N is an integer) but is prohibited by policy it may still be suggested along with a suggestion to change the policy in order to permit For the alternatives that are identified and not filtered out at step 406, the method 400 may include determining 408 metrics for each alternative according to the query performance model 204. In particular, an alternative may be represented as an operation having various attributes and a source that may be used to perform that operation. Note that where an alternative is a data access performed by first caching on a different source (local computing platform P or a different source S1-S3), the data transfer from of the source to a different source may be performed prior to performing the operation. In particular, where the alternative is implemented, caching on the local computing platform P is performed and subsequent queries referencing data that is cached are then executed with respect to the cached data. Accordingly, the latency of data transfer to the cache may be omitted when estimating metrics for the alternative at step 408.

Determining 408 the metrics may be performed by applying the query performance model 204 to the attributes of the operation (data volume, computation type) and the configuration of the alternative (where performed). In particular, for a given source P, S1-S3 for performing an operation, the model corresponding to that source may be applied to the attributes of the operation to determine estimated performance (latency, computation resources consumed, monetary cost) of performing that operation using that source. Where the operation includes data access including first caching on the premise from a source S1-S3, the model may be a model trained to relate performance to that type of operation, i.e. caching to the local computing platform P from that specific source S1-S3 by evaluating previous data accesses performed in that same manner for the local computing platform P and that specific source S1-S3.

Step 408 may include inputting a feature set for the alternative to a machine learning model trained as described above with respect to FIG. 3B. In addition, current policies 110 may be input as a policy feature set to this machine learning model as described above with respect to FIG. 3B. The machine learning model then outputs a predicted performance for that alternative. Note that where the machine learning model is trained with a policy feature set, the predictions may take into account changes in policy (e.g., increasing or decreasing of computing or storage resources such as adding more computing nodes).

The method 400 may further include implementing 410 or suggesting implementation of an alternative for an operation that has improved estimated performance relative to other alternatives for that operation. For example, a default query plan for a query may be as shown in FIG. 5A with data accesses performed at sources S1-S3 and all computation performed on the local computing platform P. If caching for a data access on the local computing platform P or on a different source S1-S3 is determined to provide improved performance for a data access operation, then an alternative query plan (e.g., see FIG. 5B) may be automatically implemented or suggested to the user, such as by way of a notification in the interface 108a. If pushing of a computation to a source S1-S3 is determined to provide improved performance, then this may be automatically implemented or suggested to the user, such as by way of a notification in the interface 108a. In the event that the user accepts a suggestion, such as by means of selecting the notification in the interface, then the alternative represented by the suggestion may then be implemented: e.g., data may be retrieved and cached or computation may be pushed according to the suggestion.

Note that there are three types of alternatives that may be suggested and implemented: (1) those that involve generating a query plan for a query that will improve its performance by pushing an operation to a source or by performing the operation on the local computing platform P, (2) those that involve caching of data on the local computing platform P or on a different source than the source of record for that data, (3) those that involve generating views and structural changes to views based on analysis of data access patterns by a single user or group of users.

Alternatives of type (1) may be implemented by the scalable query engine 104 that invokes execution of an operation on the local computing platform P or a remote source in order to achieve improved performance (lower latency, lower consumption of computing resources, lower cost). In particular, alternatives of type (1) may be performed in combination with other known query optimization techniques (e.g., SPARK) in order to improve the performance of queries. Accordingly, alternatives of type (1) may be performed by a subsystem of the engine 104 that where data and computations should be located in order to improve performance and to meet user's expected performance/resource targets (see discussion of FIGS. 16 through 18, below). As noted throughout, policies 110 may limit or direct out alternatives of any of types (1), (2), and (3) are performed and may result in execution of queries, implementation of caching, and structuring of views that is sub-optimal.

Alternatives of type (2) may be implemented by the unified access layer 106 that invokes caching of data on the premise P or a source other than the source of record or the cached data. This may include generating materialized views and maintaining coherency of cached data and materialized views created according to the methods disclosed herein. The unified access layer 106 may also translate queries to reference the location of the cached data rather than a source of record. Translation of queries may also be performed in order to better use the computing platforms 102a-102c and other computing resources of the premise P. Alternatives of type (3) may also be implemented by the unified access layer 106, which can generate views spanning multiple computing platforms 102a-102c due to its virtualization of access of databases on them.

Note that the unified access layer 106 may influence the manner in which the scalable query engine 104 improves the performance of queries. For example, the unified access layer 106 may inform the scalable query engine 104 of the availability of cached versions of data, views, materialized views, or other alternative representations of data generated according to the methods disclosed herein. In some embodiments, queries passed to the scalable query engine 104 may be annotated with "hints" that indicate which physical representation of data (source of record, local cache, remote cache, materialized view, etc.) to use when executing the query in order to improve performance.

FIGS. 4 and 5A and 5B further illustrate the hybrid multi-cloud approach that may be implemented using the unified access layer 106 and engine 104. In particular, queries may span multiple cloud computing platforms and a local computing platform in a hybrid fashion that is transparent to the user. There may be multiple cloud-computing platforms from multiple providers that are accessed in this manner, e.g., AWS, GCP (GOOGLE Cloud Platform), AZURE, and the like.

FIG. 6 illustrates a method 600 that may be executed by the system 200. The method 600 may be used to (a) streamline usage of an individual user that may include redundancies and/or (b) facilitate collaborative usage by multiple users in order to improve performance. In the description below, processing is described with respect to overlapping queries of multiple users. Overlap among the queries of an individual user may be identified and used to improve performance in the same manner.

The method 600 may include receiving 602 queries, such as by way of any of the interfaces 108a-108c from a plurality of users and evaluating 604 the structure of the queries. In particular, a query may be represented as a hierarchy or query model (see FIG. 5A) including a plurality of nodes such that each node is either a data access or a computation. A node may have child nodes representing sources of data processed by that node. Accordingly, a node may take as inputs a data access of a child node or a result of computation by a child node.

The queries may be evaluated 606 to identify source calls made as a result of the query. In particular, the source S1-S3 called, the tables accessed, the columns of tables accessed, or other data regarding data accessed as a result of a query may also be determined at step 606.

The method 600 may further include identifying 608 overlap. Overlap may be identified in the structure, e.g. the query model of a first query has identical nodes (same computation) and relationships among nodes as a second query, or in the source calls, e.g., the source calls of a first query reference a same table, column of a table, or other data as a second query. Note that complete overlap is not required but rather some partial overlap may also be identified at step 608.

The method 600 may further include generating 610 a combined alternative according to the overlap. Generating a combined alternative may be performed according to a degree of overlap as shown by the method 700 of FIG. 7.

Queries may be found 702 to overlap at the structure level in that they have overlapping query models: both overlapping sources (same tables from same source) and computation (same nodes and relationships among nodes). In such cases, a combined alternative may be created 704 as a query object defining the overlapping portion of the queries.

Queries may be found 706 to overlap at the operation level, such as having a join of tables in common or a common aggregation of one or more common tables from common sources. Accordingly, the combined alternative may be created 708 as an index or view object that includes that operation (join or aggregation) of the one or more common tables. Note that the query object may be an expanded query that includes first dimensions of a table included in a first query that overlaps second dimensions of a second query that does not include the first dimensions.

Queries found 710 to overlap at the source level (overlapping access to common table of a common source) may result in a combined alternative created 712 as a materialized (cached) view of all columns of the table referenced by the overlapping queries.

Overlapping queries that access and possibly perform computation with respect to multiple tables across multiple sources S1-S3 can result in a combined alternative according to 704 and 708 that is a query object or view object referencing the multiple sources and including any overlapping computation.

Note that a combined alternative for multiple users may be based on interactive feedback received from the multiple users. For example, the multiple users may collaborate by way of the interface 108a in order to propose combined alternatives that may then be implemented in the same manner as automatically-generated combined alternatives according to the methods disclosed herein.

The method 600 may further include evaluating 612 the combined alternatives with respect to the query performance model 204. In particular, estimated (per model 204) or measured performances of the individual queries may be compared to an estimated performance of the combined alternative. In particular, the overlap among the queries may include one or more overlapping operations including data accesses from sources and computation. Accordingly, the measured or estimated performance of performing the overlapping operations separately may be compared to the estimated performance of performing the combined alternative. In particular, the combined alternative has attributes indicating the data volume and operation type of the combined alternative. These attributes may be processed by the query performance model 204 to determine an estimated performance.

The method 600 may include evaluating 614 whether the performance of the combined alternative is better (lower latency, lower consumption of computational resources, lower monetary cost) then the combined performance of the separate overlapping operations (e.g. sum of latencies, sum of consumed computational resources, sum of monetary costs). If so, then the combined alternative may be determined to be an improvement and may be suggested 616 to a user or automatically implemented. The displayed suggestion may display the expected improvement from the combined alternative, e.g., a change in value of one or more metrics determined to be improved at step 614. An example of how step 616 may be performed is described below with respect to FIG. 8.

Figure 8:
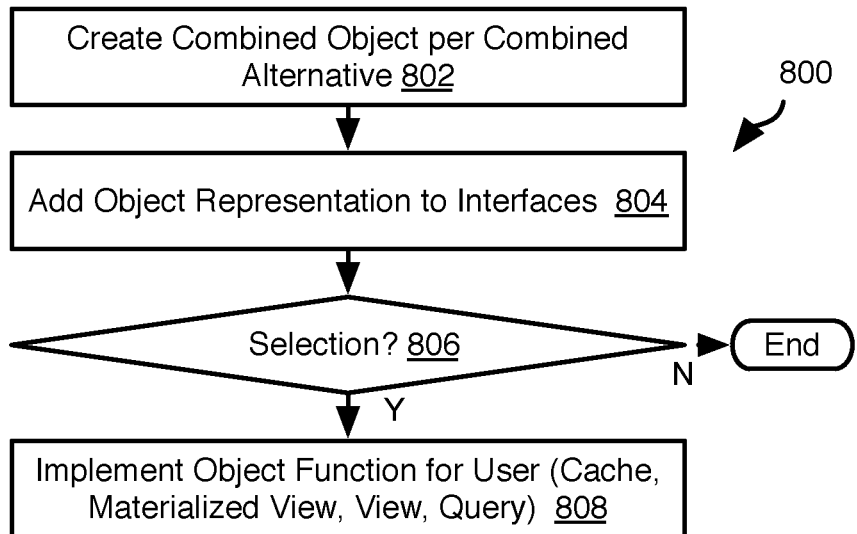
FIG. 8 is a process flow diagram of a method for implementing a combined alternative in accordance with an embodiment of the present invention.

Referring to FIG. 8, the method 800 may be executed by the system 200 in response to identifying a combined alternative providing a performance benefit as described above with respect to FIG. 7. The method 800 may include creating 802 a combined object according to the combined alternative. Note that this object is not an implementation of the combined alternative but rather an object containing parameters sufficient to define the combined alternative such that it can be implemented later. Accordingly, where the combined alternative is a result of combining queries at the query level, the object may include the query itself defining operations performed and with respect to what tables in what sources. The object may, for example, include the query model of the combined query. Where the combined alternative is an index or view (see step 708), the combined object may list the tables, sources of the tables, and how the tables are input to an operation according to the index or view. Where the combined alternative is caching of a table corresponding to multiple queries, the combined object may define a table, a source for the table, and an indication that the table is to be cached.

The method 800 may further include adding 804 a representation of the object that is linked to the object to the interface 108. The representation may be an icon, text describing the object, or the like. The representation may include a user interface element selectable by a user such that the system 200 responds to the selection by presenting information about the object, such as the parameters defining the combined alternative to be implemented by the object, the queries that were combined to obtain the combined alternative, an expected performance improvement from implementing the combined alternative (see step 614), identifiers of other users that generated one or more of the queries used to define the combined alternative, or other information. The representation may be added 804 to an interface viewable by each user that generated a query that contributed to creation of the combined object per the method 700.

The representation may further include a user interface element selectable by a user such that the system 200 responds to interaction with the user interface element to implement the combined alternative represented by the combined object. Accordingly, caching of a table, creating a combined view or index, or executing a query as defined by the combined object is performed 808 in response to detecting 806 selection of the user interface element.

Figure 9:
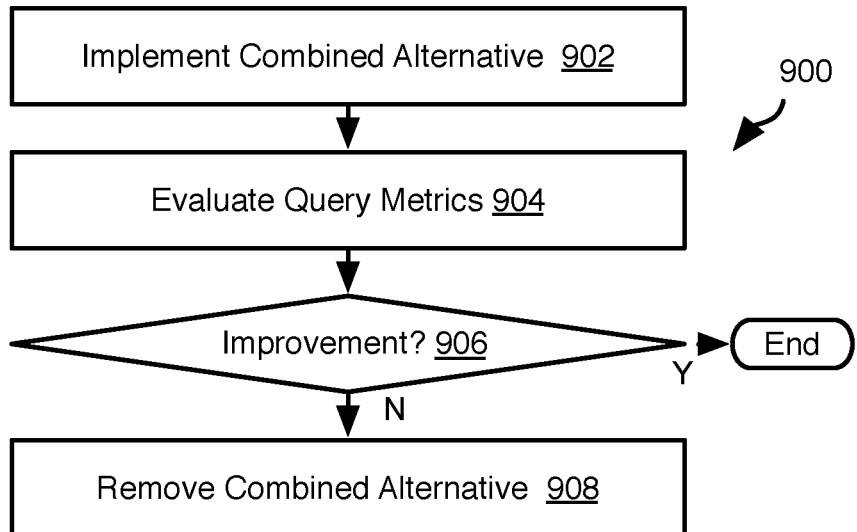
FIG. 9 is a process flow diagram of a method for evaluating combined alternatives in accordance with an embodiment of the present invention.

Referring to FIG. 9, in some embodiments, the combined object may further include data describing the performance metric that is estimated to be improved by implementing the combined object (see step 614 of the method 600). The method 900 may be executed by the system 200 when implementing a combined object either automatically or upon instruction of a user (see discussion of FIG. 8). The method 900 may include implementing 902 the combined alternative represented by a combined object (see step 808) and measuring and evaluating 904 metrics of queries implicated by the combined object: queries and operations of queries using cached tables, queries or operations of queries using an index or view, queries defined according to a combined query, etc. The manner in which these metrics are obtained may be as described above with respect to FIG. 2.

The method 900 may include evaluating 906 whether the metric (latency, consumption of computing resources, monetary cost) estimated to be improved by the combined object is in fact improved. For example, whether latency is improved by caching, whether computational resources are reduced by using a combined view or index, or the like. If not, the combined alternative may be removed 908, i.e. the caching, combined view or index, combined query, or other function implemented according to a combined object may be removed 908 and queries will instead be processed individually without combination according to the combined object.

Figure 10:
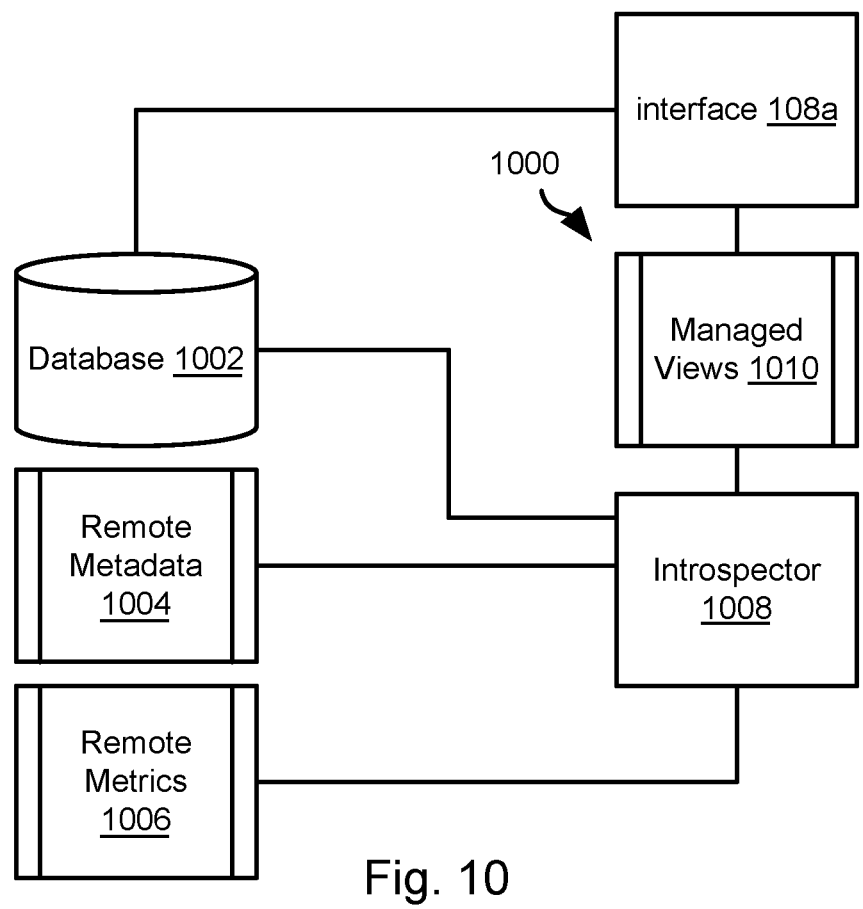
FIG. 10 is a schematic block diagram of a system for automatically generating indexes and views of a database in accordance with an embodiment of the present invention.

FIG. 10 illustrates a system 1000 that may be implemented within the environment 100. In particular, a computing platform 102*a*-102*c* that is a source S1-S3 of data may implement a database 1002 that further includes metadata 1004 describing tables stored in the database 1002. The data stored in the database 1002 may also have metrics 1006 associated therewith that may be stored in the computing platform 102*a*-102*c* implementing the database 1002 or may be calculated based on the data stored in the database 1002.

The computer system implementing the engine 104 and unified access layer 106, or some other computer system, may further implement an introspector 1008 that evaluates queries received from the interface 108*a*, and possibly from other interfaces 108*b*, 108*c* that access the engine 104 by way of the unified access layer 106.

The introspector 1008 preemptively gathers information about databases 1002 on remote computing platforms 1002*a*, 1002*b* in response to queries that invoke access to that database 1002. For example, as shown in FIG. 11, a database 1002 may include or have associated therewith a catalog that describes tables 1102*a*-1102*c* in the database.

Each table 1102*a*-1102*c* may further include metadata that described the table 1102*a*-1102*c*, such as the number of columns of each table 1102*a*-1102*c*, number of rows in each table 1102*a*-1102*c*, that data type of each column, a label of each column, or other information. The introspector 1008 may gather this information from the catalog 1100 and metadata 1104*a*-1104*c* for use according to the methods described below.

The introspector 1008 may further preemptively create managed views 1010 or indexes in response to this gathered information to facilitate subsequent queries to the database 1002 as described below.

Figure 12:
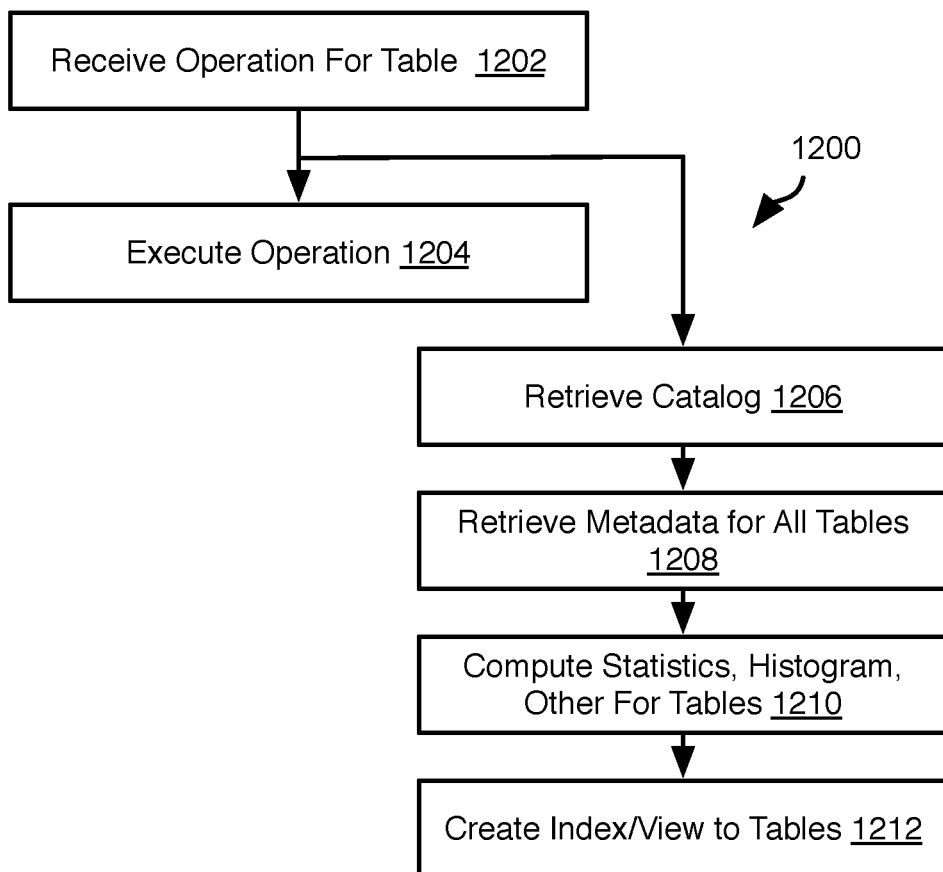
FIG. 12 is a process flow diagram of a method for automatically generating indexes and views of a database in accordance with an embodiment of the present invention.

FIG. 12 illustrates a method 1200 that may be executed by the system 1000. The method 1200 may include receiving 1202 an operation (e.g., an operation obtained from parsing a query as described above) referencing a table ("the subject table") of a database 1002 on a source. The method 1200 is particularly advantageous where the source is on a different computing platform 102*a*-102*c* than the system 1000. However, this is not required.

The operation may be executed 1204 with respect to the source. In particular, the engine 104 may issue a request to the source that the subject table and the database 1002 to perform the operation. The source returns a result of the operation to the engine 104, which returns the result to the interface 108*a*-108*c* that issued the query that included the operation through the unified access layer 106.

In parallel with step 1204 and/or in a background process, the introspector 1008 detects or monitors the operation and detects the reference to the subject table and the source. In response, the introspector 1008 retrieves 1206 the catalog 1100 of the database 1002 and the metadata 1104*a*-1104*c* for all tables (other than the subject table if metadata for it is already obtained as a result of step 1204), referenced in the catalog 1100 from the source. The introspector 1008 uses the information to identify the tables 1102*a*-1102*c* of the database 1002 and to retrieve 1208 the metadata 1104*a*-1104*c* of the tables 1102*a*-1102*c* from the source.

The introspector 1008 may further compute 1210 or retrieve metrics for the tables 1102*a*-1102*c*. The metrics may include statistics (mean, median, standard deviation, min, max) of the columns of the table, one or more histograms each of a column of values in the table, top K most frequent values (K being an integer), cardinality, samples of values from the table, or other data describing the table or columns of the table.

The method 1200 may further include creating 1212 an index of the database 1002 according to the catalog 1100 and creating views (managed views 1010) for the tables 1102*a*-1102*c* of the database 1002 using the catalog 1100. Note that this index and these views include indexes and views created without a user request to do so and prior to any access by the user of the tables referenced by the views. These views may then be represented in the interface 108*a* to the user and these representations may be selected or otherwise accessed by the user to invoke their use by the engine 104 to process queries to the database 1002.

Figure 13:
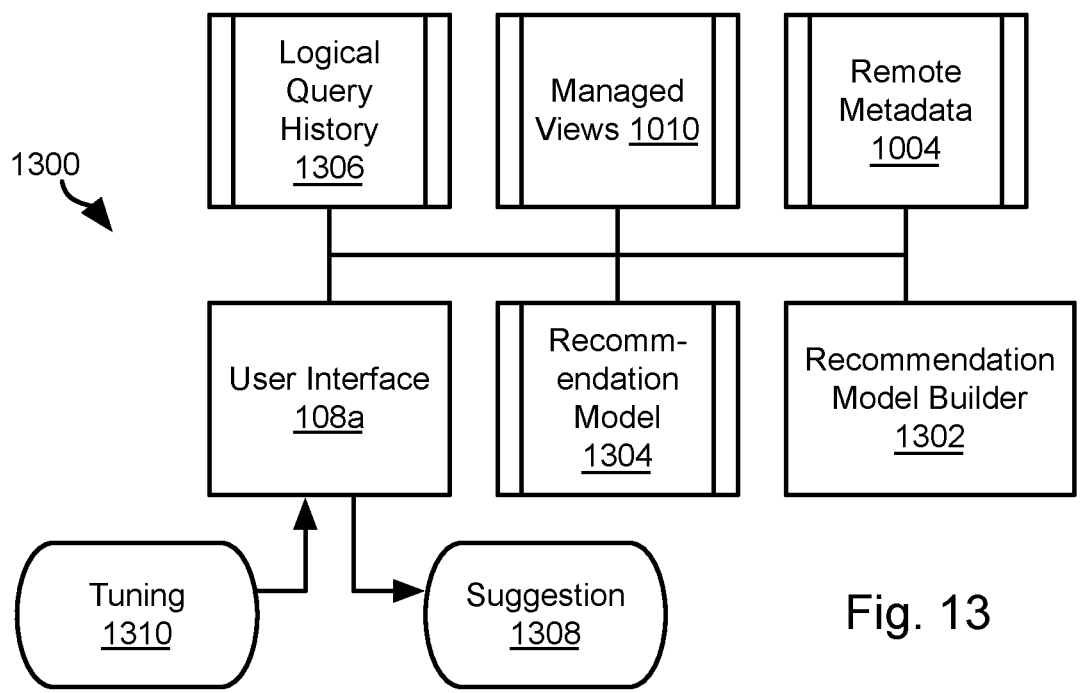
FIG. 13 is a schematic block diagram of a system for recommending data sources in accordance with an embodiment of the present invention.
Figure 14:
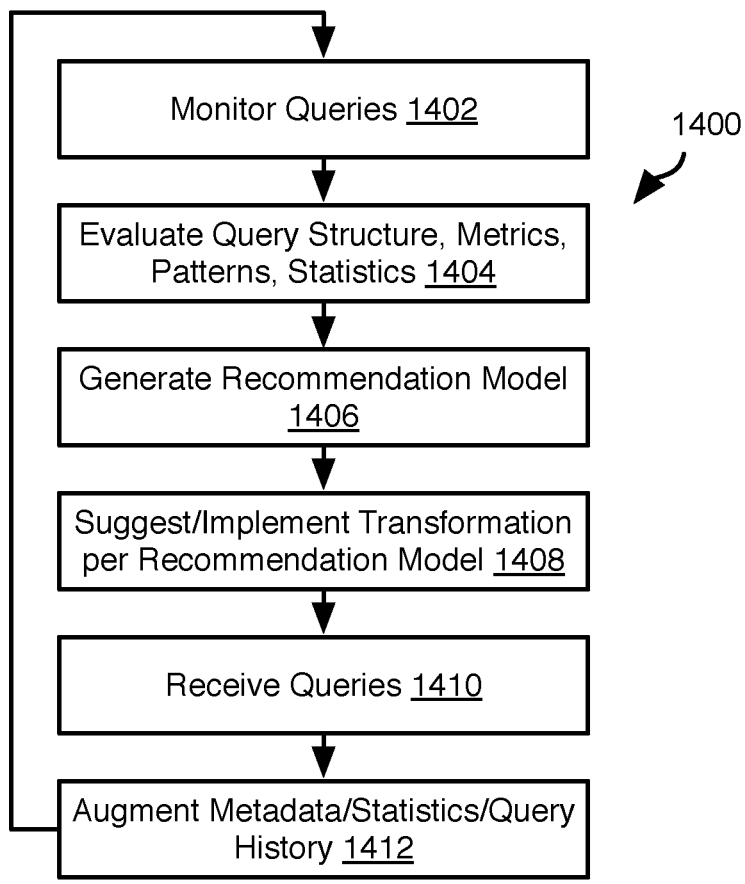
FIG. 14 is a process flow diagram of a method for recommending data sources in accordance with an embodiment of the present invention.

Referring to FIGS. 13 and 14, the additional information gathered according to the method 1200 may be used to provide suggestions or automated adjustments for the improvement of queries of a user. To that end a system 1300 in the environment 100 may include a recommendation model builder 1302 that generates a recommendation model 1304. The recommendation model builder 1302 may take as inputs some or all of the following: the remote metadata 1004, the managed views 1010, and a logical query history 1306 that is listing of queries received from one or more of the interfaces 108a-108c.

In particular, the logical query history may represent queries as strings as received from the user or as query models derived from query string received from a user. Note that queries may also be generated by an application implementing an interface 108a-108c. The logical query history of a query may include an actual query model of a query (including any pushing of a computation to a source or referencing of a cached data on a second source rather than a first source that is the source of record for the data) and may further include the original query model based on the query received from an interface 108a-108c. Queries including these pairs of actual and original query models may then be used to suggest the creation of a new view with those specific operations against a single source that could then be cached, receive pushed computations, or have some other aspect of its operation modified as described herein.

Note further that inasmuch as the unified access layer 106 and engine 104 operate with respect to a hybrid multi-cloud environment, the logical query history references queries with respect to multiple computing platforms 102a-102c and may reference queries with respect to multiple cloud-computing platforms. Multiple users may access the unified access layer 106 by way of multiple interfaces 108a-108c such that the local query history further includes queries generated by multiple users, e.g. a team of users. Accordingly, the recommendation model builder 1302 may be used to improve the performance of collaborative use of a hybrid multi-cloud environment in accordance with the approach described below.

The user interface 108a or a component in the engine 104 or unified access layer 106 may use the recommendation model 1304 to output suggestions 1308 to the user through the user interface 108a, the suggestions 1308 being suggested modifications to queries in order to improve performance, completeness, or other property of a result of a query. The user may also provide tuning parameters 1310 through the interface 108a in response to the suggestions 1308. The tuning parameters 1310 may then be implemented by the engine 104 and/or unified access layer 106 with respect to a query.

FIG. 14 illustrates a method 1400 that may be executed by one or more computer systems implementing the system 1300. The method 1400 may include monitoring 1402 queries, such as by evaluating the logical query history 1306 of one or more users with respect to one or more databases 1002. The method 1400 may further include evaluating some or all of the structures of the queries, metrics of the queries (e.g., performance metrics as described above with respect to FIGS. 1 through 5B), and statistics (see discussion of step 1210) of tables referenced by the queries.

The method 1400 may include generating 1406 the recommendation model 1304 according to the evaluation 1404. Transformations may then be suggested 1408 according to the recommendation model 1304 and then implemented upon approval by the user. Alternatively, suggestions according to the recommendation model may be autonomously implemented. In particular, generating of views, materialized views, caches and the like as well as transformations of queries to take advantage of these may be performed autonomously by the unified access layer 106. In yet another alternative, transformations may be implemented for a query followed by issuing a notification to the user requesting confirmation whether the transformation should be kept or not repeated for subsequent queries (for example where the transformation involves caching that could improve performance and can be easily reversed if not desired by a user). The recommendation model 1304 may be generated 1406 and suggest 1408 implementations of transformations according to some or all of the following examples.

Note that the multiple of the transformations examples below may be implemented in a combined fashion and that some of the transformations in the examples below may also be implemented and subsequently pruned in response to changes in the query history or databases queried over time. Likewise, multiple transformations may be generated for a single query (e.g., for different partial queries of a single query) In particular, where the basis of a transformation with respect to one or more tables as described below ceases to be present, that transformation may be removed (stop caching, remove view, etc.). Likewise, a transformation may be pruned where a change in the policies 110 indicates that the transformation is no longer permitted (e.g., a change in available resources for a particular source).

Example 1

The query history may indicate one or more joins of table T1 from source S1 and table T2 from source S2, where S1 and S2 could be the same source or different sources. Table T1 has cardinality C1 and table T2 has cardinality C2. Based on the cardinalities C1 and C2 the computational cost of joining tables T1 and T2 may be estimated. The monetary cost of performing the join on source S1, S2, or a local computing platform P may then be estimated. The computational latency based on processing speed of sources S1, S2, and P for performing the join may be computed based on the computational cost. A network latency of various scenarios for performing the join may be computed based on the size of tables T1 and T2, where the scenarios include: transfer T1 from S1 to S2 and transfer result of join to P, transfer T2 from S2 to S1 and transfer result of joint to P, transfer T1 and T2 from S1 and S2, respectively, to P. A monetary cost of a scenario may also be computed, such as using the query performance model 204 discussed above. Based on these measures of performance (latency and cost), a scenario may be identified that has improved performance relative to other scenarios, e.g. has a score based on a sum or weighted sum of computational latency, network latency, and cost that is less than the score of another scenario calculated in the same manner.

Accordingly, the recommendation model 1304 may be programmed at step 1408 to suggest implementing joins of tables T1 and T2 according to the scenario identified as having improved performance. In some embodiments, the recommendation model 1304 may further be programmed to execute joins according to the identified scenario anytime there is a join of any table TA on source S1 and any other table TB on source S2 having a difference in cardinality approximating the difference in cardinality between tables T1 and T2 (e.g., the cardinality of TA being (X + or − Y) % larger than the cardinality of TB, where X is the difference in cardinality of T1 and T2 and Y is a tolerance that is either a fixed value or a function of attributes of one or both of TA and TB.

Example 2

The metadata from various tables on various sources may be evaluated to identify related data sets. In particular, the system 1300 may get foreign key information from the tables of remote sources and determine whether the foreign keys of tables on different sources overlap one another or the local keys of databases hosted by the local computing platform P executing the system 1300. For example, if all of the keys of a table T1 on source S1 match the keys of a table T2 on source S2, then tables T1 and T2 may be determined to be related such that the recommendation model 1304 may be programmed to suggest including T2 in queries referencing T1, and vice versa.

Example 3

Caching of a table may be recommended based on the query history, e.g., a frequently accessed table may be cached on a local computing platform P or a source other than the source of record for that table. Likewise, the query history may be evaluated to determine whether the cached table should be indexed. The index may be a tree index, bitmap index, or other type of index.

For example, if filtering operations are identified in the query history with respect to a same column of a table with a threshold level of frequency (e.g., a threshold percentage of filtering operations referencing that column), then the table may be both cached and indexed with respect to that column. In some index, a table may be a join of two or more tables with respect to a particular key such that indexing with respect to that key is advantageous. In other instances, reads of a table are for specific values or are scans of the table such that indexing is not beneficial. Accordingly, indexing is not suggested in such instances. In still other instances, the query history reads or filtering is not performed predominantly (e.g., is below the threshold level of frequency) with respect to any particular key or column of a cached table such that indexing is omitted as not being advantageous.

In some embodiments, the recommendation model 1304 may determine whether a cached table should be partitioned in the cache. In particular, this may be done where the query history indicates that particular columns or rows of the cached table are used more than others or to facilitate parallel access of different portions of the cached table as indicated by the query history.

The recommendation model 1304 may further suggest a frequency of updating of a cache based on frequency of writes to the table that is cached, e.g. an update frequency that is some frequency of the frequency of writes to the table. A timing of creating and updating a cache may be determined by the recommendation model 1304 according to the query history, e.g., performed during low usage periods or after performance of update cycles on the source of record for the cached data.

Example 4

A view of one or more tables on one or more sources S1-S3 may be suggested along with caching of a materialized version of this view on one of these sources, the premise P, or a different source. Performing of this action may be recommended by the recommendation model 1304 in response to detecting a number of queries by one or more users of a team that reference the data in the view and that meet a threshold criteria, e.g. where the number of queries per unit time and the volume of data referenced indicates a performance savings from caching in a materialized view based on the query performance model 204. In particular, a cached materialized view may represent a "partial query," e.g. a portion of the accessed tables and operations performed on the accessed tables that were included in one or more previous queries that may then be cached in a materialized view for subsequent use.

Caching the tables as a materialized view rather than separately may be also be suggested/implemented to facilitate pushing down of computation to the source caching the materialized view. For example, where an analysis of the query history indicates that it would be advantageous to push down computation of queries performing an operation with respect to two or more tables, the recommendation model 1304 may further suggest/implement a materialized view corresponding to that operation in order to further improve execution of subqueries. Note that this is particularly helpful where the materialized view is of tables on different sources S1-S3 such that the unified access layer's 106 virtualization enables both the detection of the possibility of the materialized view and its implementation.

Example 5

The recommendation model 1304 may suggest separating a view defined by a user or even a view that is automatically generated according to the methods disclosed herein. In particular, this may be done to improve performance when computation involving the tables referenced by the view is pushed down to a source of the tables or a location where the tables are cached.

Example 6

The recommendation model 1304 caching of a view or a table is disabled where usage frequency of the view or table as indicated in the query history is below a predefined threshold (i.e. cold data) or relative to other views or tables referenced in the query history. the recommendation model 1304 may further suggest disabling of caching of a table where the updating of the table is performed at a frequency below some threshold or is low relative to other tables.

Example 7

The recommendation model 1304 may suggest pushing an asymmetric join of a large table with a small table (some predefined percentage smaller than the large table) to the computing platform hosting the large table. In contrast, for large parallel joins (a join tables that are both larger than a predefined size) on separate sources, the suggestion may be that the join be shifted to the local computing platform P and that the tables be cached on the local computing platform P.

Example 8

The query history may indicate queries to multiple sources having tables with identical keys. Accordingly, the recommendation model 1304 may detect that and suggest expanding a query to one of these tables to include these tables from multiple sources having identical keys (i.e. blending the multiple tables).

Example 9

Many business intelligence (BI) queries (e.g., from interface 108*c*) follow a similar pattern of joining tables in multiple dimension tables with a fact table to allow for grouping on, filtering by, or displaying dimension details. The BI tool will then typically execute these joins for every single query that it executes. Similar issues exist for machine learning (ML) model building, since the source data may have to be queried multiple times in order to generate a model or perform other functions of a ML algorithm.

Accordingly, the recommendation model 1304 may detect such activity and suggest or implement transformations accordingly. For example, instead of computing a join for every single query from the BI tool or ML algorithm, the join can be materialized (denormalized) on the local computing platform P, a source of one or both of the tables joined, or another source to which the materialized view is pushed in order to improve performance of a subsequent computation according to the methods disclosed herein. This will improve performance of downstream queries that reference that join.

This approach improves performance especially in cases where the tables to be joined are on different sources. For example, if a join as described in Example 9 is of tables on different sources, the recommendation model 1304 may suggest a cached materialized view of this join on the local computing platform P. The view may be a complete join of all the original tables referenced in the preceding query. Since the tables are on different sources, the virtualization functionality of the unified access layer 106 may be used to retrieve the data from the different sources and create the materialized view.

If the tables referenced by the join are on the same source that supports creation of materialized views, this functionality may be used. Otherwise, the unified access layer 106 may invoke creation and maintenance of the materialized view on that source, the local computing platform P, or a different source.

Note that multiple materialized views may be combined where indicated by the query history. For example, where materialized views of multiple joins are all referenced in the same query one or more times, a materialized view of the multiple joins may be created, such as on the same source on which the individual materialized views of the joins are created.

Note also that a materialized view may be pruned (deleted) in view of the query history, such as where a frequency of occurrence of queries including the join of a materialized view is below a threshold for a predetermined time period.

Note also that the materialized views may be created and pruned in response to changes in system capabilities. For example, where more storage is added to a source, the number of materialized views may be increased. For example, for a first system capability, a certain amount of storage is available for materialized views and a first number of joins having the highest frequency of occurrence are selected and corresponding materialized views are created. If the amount of storage increases, a second number of joins having the highest frequency of occurrence, which may include some joins omitted from the first number of joins, may be selected and corresponding materialized views may be created. When storage decreases, the reverse of this process occurs such that some joins in the second number will be pruned as occurring less frequently than those joins in the first number of joins.

Example 10

Many BI queries follow similar patterns of computing aggregations (e.g., count, sum, avg) of one or more metrics on results filtered on one or more dimensions. These aggregations can be generalized either:

By removing the filter and then computing the aggregation within a dimension defined by the columns used in the filter (grouping by the columns of the filter).

Aggregating at a more fine-grained level of a complex dimension and storing aggregations in a form that allows for combining partial aggregation results into a final aggregated value (drill-down optimization).

A combination of the above two approaches.

For example, consider the following transformation:

A user submits Query 1: SELECT o_orderstatus, sum (o_totalprice) AS totalprice, max(o_orderdate) AS latest_orderdate FROM orders WHERE o_orderpriority='1-URGENT' GROUP BY o_orderstatus In response to Query 1, the recommendation model 1304 propose materializing (caching) the following view query (called "preaggregated" in this example) for use with subsequent queries: SELECT o_orderstatus, o_orderpriority, sum(o_totalprice) AS totalprice, max (o_orderdate) AS latest_orderdate FROM orders GROUP BY o_orderstatus, o_orderpriority The recommendation model 1304 then transforms subsequently received queries to use the view. For example, Query 1 if received subsequently would be transformed to:

SELECT o_orderstatus, totalprice, latest_orderdate FROM preaggregated WHER E o_orderpriority='1-URGENT'

The recommendation model 1304 will choose the above transformation to support "similar" queries where the filter condition may be changing, but the metric summarization is not. This helps to reduce the amount of data fetched from source systems and the amount of compute time. The resulting cache entries are also much smaller than the original dataset. This enables the system to cache many versions of these pre-aggregated queries In another example, datetime columns are special since most tools treat datetime dimensions dynamically: a single datetime column can be treated like a record of year, month, day, hour, minute, etc. (i.e. a hierarchical dimension). A transformation of a query referencing a datetime column according to the approaches described above may be as follows:

The user submits Query 2: SELECT YEAR(l_commitdate) AS 'year', MONTH(l_commitdate) AS 'month', MIN(l_discount) AS min_discount, MAX(l_discount) AS max_discount FROM lineitem WHERE l_commitdate between '1997-10-01' and '1998-10-31' GROUP BY YEAR(l_commitdate), MONTH(l_commitdate)

In response to Query 2, the recommendation model propose materializing a view query (called "preaggregated" in this example: SELECT l_commitdate, MIN (l_discount) AS min_discount, MAX(l_discount) AS max_discount FROM lineitem GROUP BY YEAR (l_commitdate), MONTH(l_commitdate)

The recommendation model 1304 may then recommend transforming subsequent queries in view of the view created. For example, Query 2 if subsequently received could be transformed as follows: SELECT YEAR (l_commitdate) AS 'year', MONTH(l_commitdate) AS 'month', min_discount, max_discount FROM 'preaggregated' WHERE l_commitdate between '1997-10-01' and '1998-10-31'

The above transformation allows the user to query with different time ranges while reducing the amount of data cached and reducing the compute time of the aggregations.

Example 11

The approach of Examples 9 and 10 may be generalized to include more generalized improvements in the execution of subqueries. For example, BI queries and ML model building will use subqueries as part of their computations. With Push-Down of computations enabled, the incoming query may be broken up into smaller subqueries to be pushed down to the source systems. Whether to push down a subquery to a source may be determined according to the approaches described herein. In response to instances where a subquery is pushed down for data access and computation by a remote source, the recommendation model 1304 may suggest creating a view corresponding to that subquery on the remote source, which may be a materialized view.

Example 12

In some instances, lookup/dimension data may exist on a different source S1-S3 from data sets they can be joined with. Alternatively, lookup/dimension data may need to be cleaned and prepared by the unified access layer 106 before it can be joined to data that exists on another source. The recommendation model 1304 may therefore detect a join in such a scenario and suggest or implement pushing of the data for a remote table or results of view maintained by the unified access layer 106 onto the source system to enable a join. This enables more computation to be performed on a source system instead of on the local computing platform P.

Referring again to FIG. 14, in some embodiments, suggested transformations per step 1408 may be presented to a user for acceptance. For example, as described above with respect to FIG. 8, an object including data defining the suggestion may be created and a representation of it displayed to a user. The user may then interact with the representation to view the suggestion and to invoke execution of the suggestion.

Queries may then be received 1410 and executed with respect to views and cached data as defined at step 1408. As noted above, the unified access layer 106 may transform the query to change references to sources of record to references to cached tables and materialized views on the premise or a source other than the source of record.

The method 1400 may further include augmenting 1412 the query history 1306 according to the queries received at step 1410. Likewise, any new tables referenced by a query at step 1408 may be used to augment the query history 1306 and metadata 1004. This new data may then be processed according to the method 1200, 1400, or other methods disclosed herein.

Figure 15:
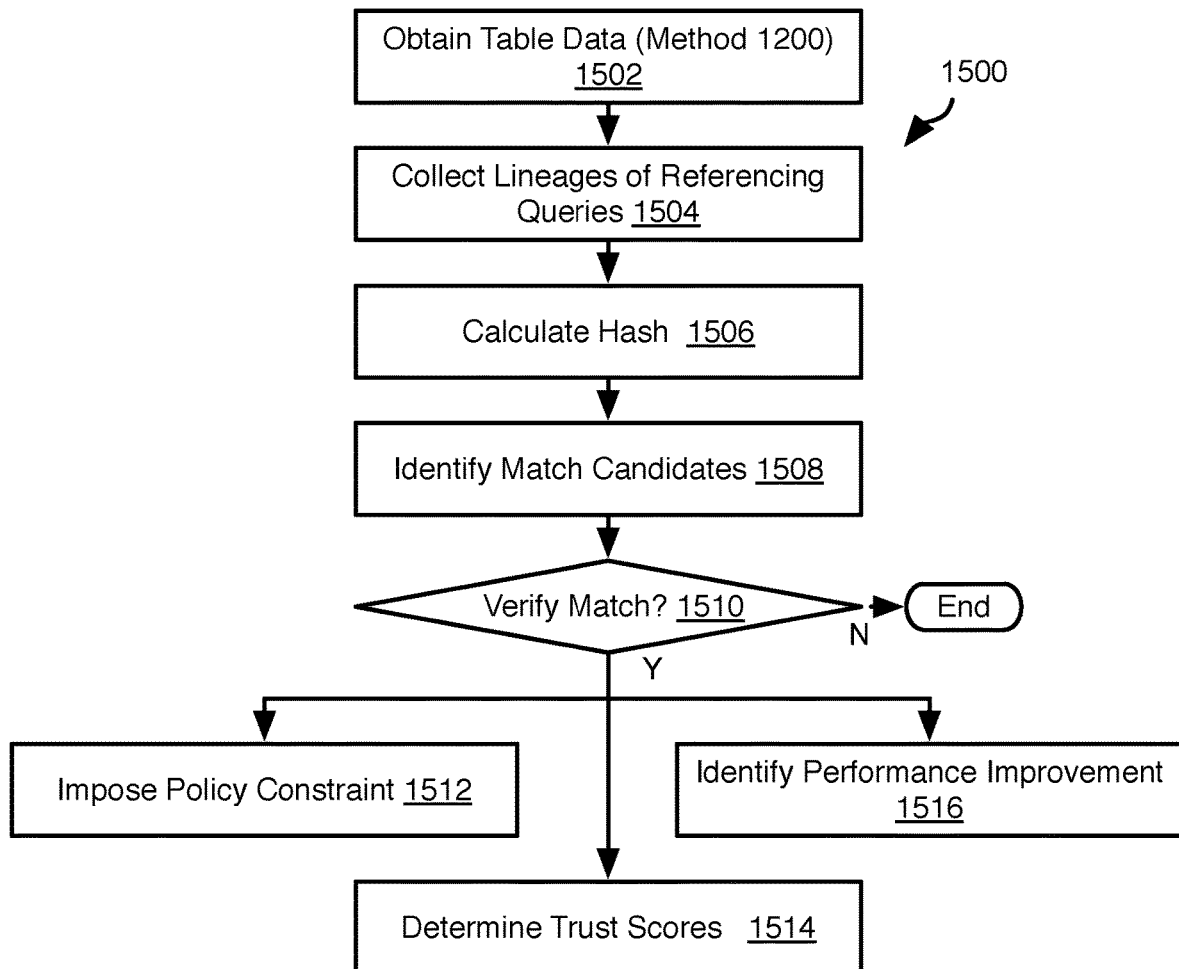
FIG. 15 is a process flow diagram of a method for identifying redundant data sources in accordance with an embodiment of the present invention.

Referring to FIG. 15, the illustrated method 1500 may be executed in the environment 100, such as by one or more computing systems implementing the engine 104, unified access layer 106, and/or user interface 108*a*.

The method 1500 may include obtaining 1502 table data for one or more tables on one or more sources, including one or more remote sources. Step 1502 may include executing the method 1200 with respect to one or more queries. The method 1500 may further include collecting 1504 the query models of one or more queries. The query models may be hierarchies as described above with respect to FIGS. 5A and 5B in which each node is either a data access with respect to a source or an operation performed with respect to an output of another node (operation or data access).

The method 1500 may further include generating a hash with respect to one or more tables discovered at step 1502 or referenced in queries at step 1504. For example, the hash for a table may be a function of some or all of the following attributes of the table: keys, number of columns, number of rows, statistics (e.g., some or all of the statistics described with respect to the method 1200), a query model or a portion of a query model that occurs in one or more queries that reference the table. With respect to query model, one or more queries may have query models that reference a table, the query model used at step 1508 may include a portion of a lineage that both references the table and is common to multiple queries: e.g. a join, aggregation, or other operation that is performed by multiple queries with respect to the table. Where the common portion of the query models includes a join, the query models may be deemed common if the joins of the query models reference the table and a same second table.

The hash from step 1506 may be according to a function such that the output of a first hash will be increasingly closer in value to a second hash where first data (steps 1502, 1504) used to generate the first hash is increasingly similar to second data used to generate the second hash. For example, the hash function may be a locality-sensitive hash function.

The locality-sensitive hash function of a table may be a function of some or all of the following attributes of a table: features of a schema of the table, statistical values based on the table, the top K most frequent values (K being an integer), a histogram of one or more columns of the table, a sample of data from one or more rows and columns of the table, or the like. Where a sample of data is used when comparing two tables, the column and row positions of the data sampled may be selected based on statistical analysis of the tables being compared. For example, a machine learning model may be trained with pairs of tables labeled with their status (matching or non-matching) to determine statistical metrics that may be used to select sample for including in hash that are likely to be relevant and facilitate the successful identification of matching tables.

The method 1500 may include identifying 1508 match candidates, i.e., sets of tables whose corresponding hashes from step 1506 are identical. For each set, the method 1500 may include determining 1510 whether the tables are in fact identical. For example, for a first table in a set and a second table in a set, the values from step 1502 for the first and second table may be compared. For example, the same keys, the same number of columns, same data type in each column, the same number of rows, the same statistics, the same histograms for the same columns, etc. In some embodiments, one or more heuristics based on the first and second tables may be compared. They may include heuristics based on continuous and/or categorical data (i.e., non-numerical data) contained in the first and second tables.

If these values are found to be identical, the tables may be verified 1510 to be identical. In other embodiments, if the values from step 1502 are found to be identical, then step 1510 may include performing a value-by-value comparison for the tables, i.e. comparing a value at a row and column position in the first table to the value at the same row and column position in the second table. If all values are found to be identical, the tables may be verified 1510 to match.

If two or more tables are verified 1510 to be identical, then various actions may be taken with respect to these tables. For example, a policy constraint (e.g., from policies 110) may be imposed 1512 that restricts use of all but one of the tables. For example, a table may be constrained to be stored on a particular source such that identifying the table on a different source or on the local computing platform P is a violation of this policy. Accordingly, the method 1500 may include suggesting using the copy of the table on the source of record in the place of identical cached copies of the table found elsewhere (e.g., local computing platform P).

The method 1500 may include determining 1514 trust scores for the copies of the table to determine which is more trustworthy, e.g., more current, authentic, more secure, etc. For example, a trust score could be calculated for each copy of a table that is a function of whether the table is stored by a source of record, how frequently the copy of the table is updated (e.g., a cached copy), a level of security provided by a source hosting the copy of the table, or other parameters. These trust scores may then be presented to the user by way of the interface 108a such that the user may select among the copies of the table to use for subsequent queries. Alternatively, the copy with the highest trust score may be automatically selected for processing subsequent queries. For example, references to non-selected copies may be replaced with references to the selected copy with the highest trust score when executing subsequent queries.

Where copies of a table are found 1510 to match, the method 1500 may further include identifying 1516 a performance improvement from substituting one table from a set of matching tables with another copy. In particular, this may include using the query performance model 204. For example, in the method 400, alternatives are evaluated to determine their performance (see discussion of steps 406 and 408). Accordingly, step 406 may include identifying alternatives in view of the known matches. For example, table T1 is on source S1 and table T2 that is found to be a match is on source S2. Accordingly, an operation referencing table T1 may have the following expanded list of alternatives: perform access on S1 with processing on local computing platform P, perform access on P (cache T1 from S1) and processing on local computing platform P, perform access and processing on S1 (provided S1 has capacity to do so), perform access on S2 with processing on local computing platform P, perform access on local computing platform P (cache T1 from S2) and processing on local computing platform P, and perform access and processing on S2 (provided S2 has capacity to do so). Accordingly, step 1516 may include automatically redirecting accesses from one table to a matching table on a different source in order to improve performance or providing suggestions to do so in the form of suggestions through the interface 108a, which the user may then select to invoke implementation as described above with respect to FIG. 4.

In another example, a table T1 on source S1 may be determined to be part of a composite of table T1 and T2 on local computing platform P or another source S2. A performance improvement may include suggesting use of the composite. An accuracy improvement may include suggesting using the tables T1 and T2 from the source S1 rather than the composite to avoid using non-current data.

Figure 16:
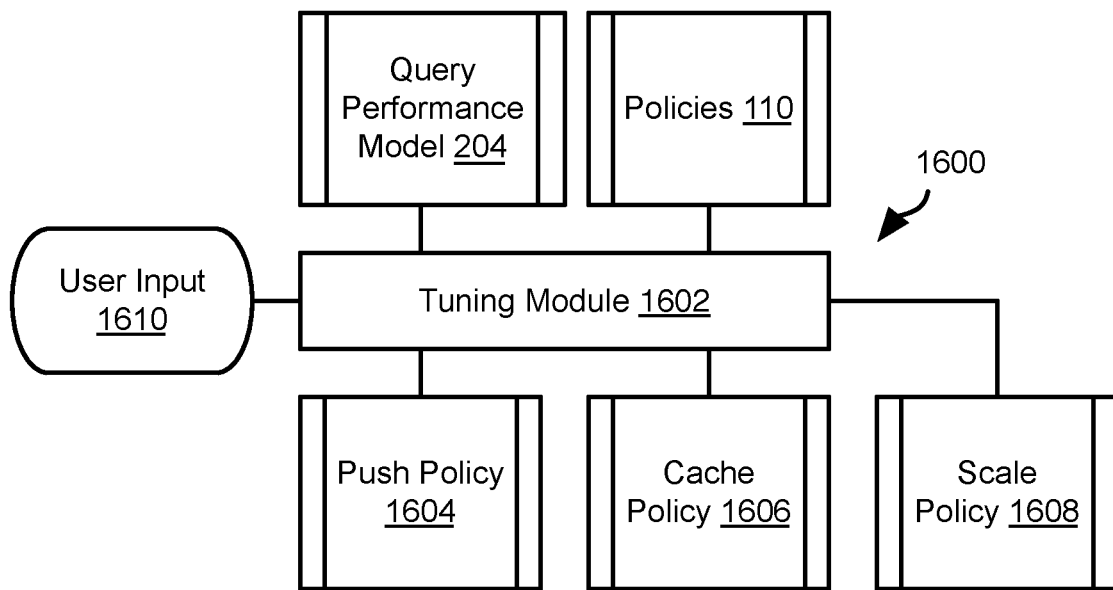
FIG. 16 is a schematic block diagram of a system for tuning implementation of queries according to desired performance in accordance with an embodiment of the present invention.

FIG. 16 illustrates a system 1600 that may execute within the environment 100 in order to process queries according to user preference regarding balancing of latency with respect to computational resources and monetary cost required to achieve that latency.

In particular, the system 1600 may include a tuning module 1602 that executes on one or more computer systems executing the engine 104 and unified access layer 106 or some other computer system. The tuning module 1602 may access the query performance model 204 and policies 110. The tuning module 1602 may further facilitate the definition and implementation of a push policy 1604, cache policy 1606, and scale policy 1608. In particular, the push policy 1604 specifies parameters defining what computations should be pushed to the source hosting the data that is the subject of the computation. The cache policy 1606 specifies which data should be maintained in a cache on the local computing platform P or a cache on a different source S1-S3 than the source of record for that data and may further specify parameters regarding writing back the cached data to the source from which it was retrieved or from updating the cached data from the source. The scale policy 1608 specifies when additional resources (computational or storage) will be acquired from a cloud computing platform 102a or other scalable computing resource.

The tuning module 1602 may define the policies 1604-1608 in response to user inputs 1610 received by way of the interface 108a. The tuning module 1602 may likewise present an interface for a user to see implications of tuning and to provide the tuning parameters to the tuning module 1602.

Figure 17:
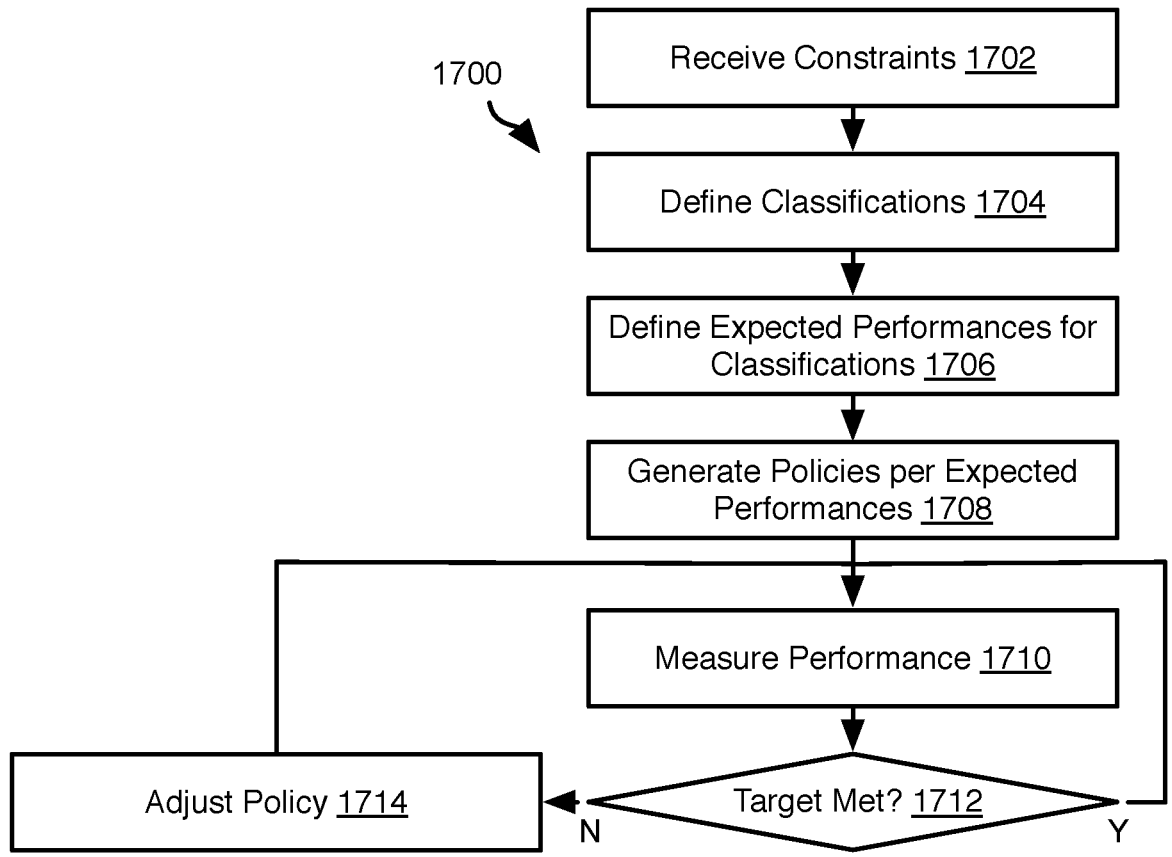
FIG. 17 is a process flow diagram of a method for generating policies according to expected performance in accordance with an embodiment of the present invention.

FIG. 17 illustrates a method 1700 that may be executed by the tuning module 1600. The method 1700 may include receiving 1702 constraints. The constraints may include some or all of the constraints included in the policies 110, such as those specifying which source is able to perform computations, what data (e.g. which tables from which source) is permitted to be cached on the local computing platform P, how often data may be read into a cache, how long data in cache is valid, or the like. The constraints 1702 may further include other constraints such as a budgetary constraint specifying how much money, processing time, cache capacity, or other resource is allocated to a user, application, workflow, workspace, or other division to which a query may be assigned. The constraints may specify these constraints in general or may specify constraints for each source of a plurality of sources for a user, application, workflow, workspace, or other division to which a query may be assigned.

The method 1700 may further include defining 1704 classifications of queries. The classifications may be applied to each query such that each query is processed according to constraints or policies 1604-1608 corresponding to its classification. Classifications may be associated with a particular user, application, workflow, workspace, or other division to which a query may be assigned. For example, some applications, e.g. data science interface 108b may perform high volume computations without needing low latency. In contrast, a business intelligence tool 108c may be expected to provide low latency. The classifications at step 1704 may be received from an operator or be pre-defined by an administrator or developer of the tuning module 1602.

Queries may also be classified based on attributes. For example, queries may be classified based on the volume of data referenced by the query, e.g. a first range of referenced volumes of data being assigned to a first classification, a second (different) range of referenced volumes being assigned to a second classification, and so on for any number of ranges. Queries may also be classified based on the complexity of the computation, e.g. a score may be assigned as a function of a number and type of computations and a score may then be classified to one of a plurality of classifications corresponding to a range including that score. In still other embodiments, a classification may be manually assigned to a query by a user.

The method 1700 may further include defining 1706 expected performance for each classification. The expected performance may be specified in terms of a quality of service (QoS), service level agreement (SLA), e.g. a desired latency (average, maximum) for queries belonging to that classification. In still other embodiments, the expected performance may be specified in terms of data volume, e.g. $A+V*L$, where A is a constant, V is the data volume, and L is constant indicating a relationship between data volume and a desired latency. Of course, any other function may be used to determine a desired latency of a query in terms of data volume. The function for each classification may be different. The expected performance may be input by a user, such as by way of the interface 108. For example, a slider, dial, or other input field may enable a user to specify the expected performance.

In some embodiments, the expected performance may be defined with respect to the constraints from step 1702. In particular, a minimum latency may be estimated based on budgetary constraints, caching constraints, pushing constraints, or other constraints that limit available options and resources for reducing latency. For example, using the query performance model 204, a latency and consumed computing resources for a given scenario (caching, pushing computation, etc.) for executing a query with respect to a volume of data (e.g., an expected volume of data, maximum volume of data, or some other value) may be calculated. The cost of implementing that scenario may then be determined based on the computational resources consumed by that scenario.

In some embodiments, performance expectations may be specified only in relative terms, e.g., a classification may be assigned a high expected performance, medium expected performance, or low expected performance. Queries classified as having high expected performance will be performed with a scenario providing higher performance than queries classified as medium or low. Likewise, queries classified as having medium expected performance will be performed with a scenario providing higher performance than queries having the low expected performance. Any number of levels may be defined in this manner.

The method 1700 may further include generating 1708 policies 1604-1608 for each classification according to the expected performances determined at step 1706. In particular, for an expected performance that has a high relative latency or a specified latency requiring it, performance enhancements such as caching, pushing computation to a source of data, or the like may be mandated by the policies 1604, 1606. Likewise, scaling out to achieve the high relative latency or specified latency may be specified in the policy 1608. Similarly, for a classification assigned a low latency (relative latency or actual specified latency value), the policies may prohibit caching or consumption of resources on sources that have monetary cost in order to avoid impacting classifications with a higher expected performance and avoid incurring costs for queries that are of low priority.

In some embodiments, generating 1708 a caching policy 1606 may include generating an indexing policy for cached data, i.e. whether or not cached data is to be indexed and what key or column is to be indexed. The type of the index may also be specified (tree, bit map).

In some embodiments, queries are executed according to the policies defined at step 1708. This may include processing queries using the approach described below with respect to FIG. 18. The performance of these queries (e.g. latency) may be measured 1710 and evaluated 1712 with respect to the expected performances for the queries, such as the expected performances defined at step 1706. If the expected performance is not met, then the method 1700 may include adjusting 1714 the policies. For example, where an expected performance is not met by one or more queries or a classification, the policies for that classification may be modified to include further performance enhancements, such as materialized views on the premise P corresponding to one or more operations (joins, sub-queries, groupings, aggregations, etc.) of the queries, caching of tables referenced by the queries on the premise P. Where indicated by the query performance model 204, performance enhancement may include shifting computation of these operations to a source of the tables referenced by the operations or creating a materialized view on the source of the tables, the materialized view implementing an operation included in the queries such as joins, sub-queries, groupings, aggregations, or the like. Performance enhancements may include any of the approaches described herein for transforming or improving execution of a query in non-heterogeneous data management and analytic computing platform.

Note that where a target latency is exceeded, adjustments at step 1714 may include reversing or undoing one or more performance enhancements such as are mentioned in the previous paragraph in order to avoid unnecessary consumption of resources.

Figure 18:
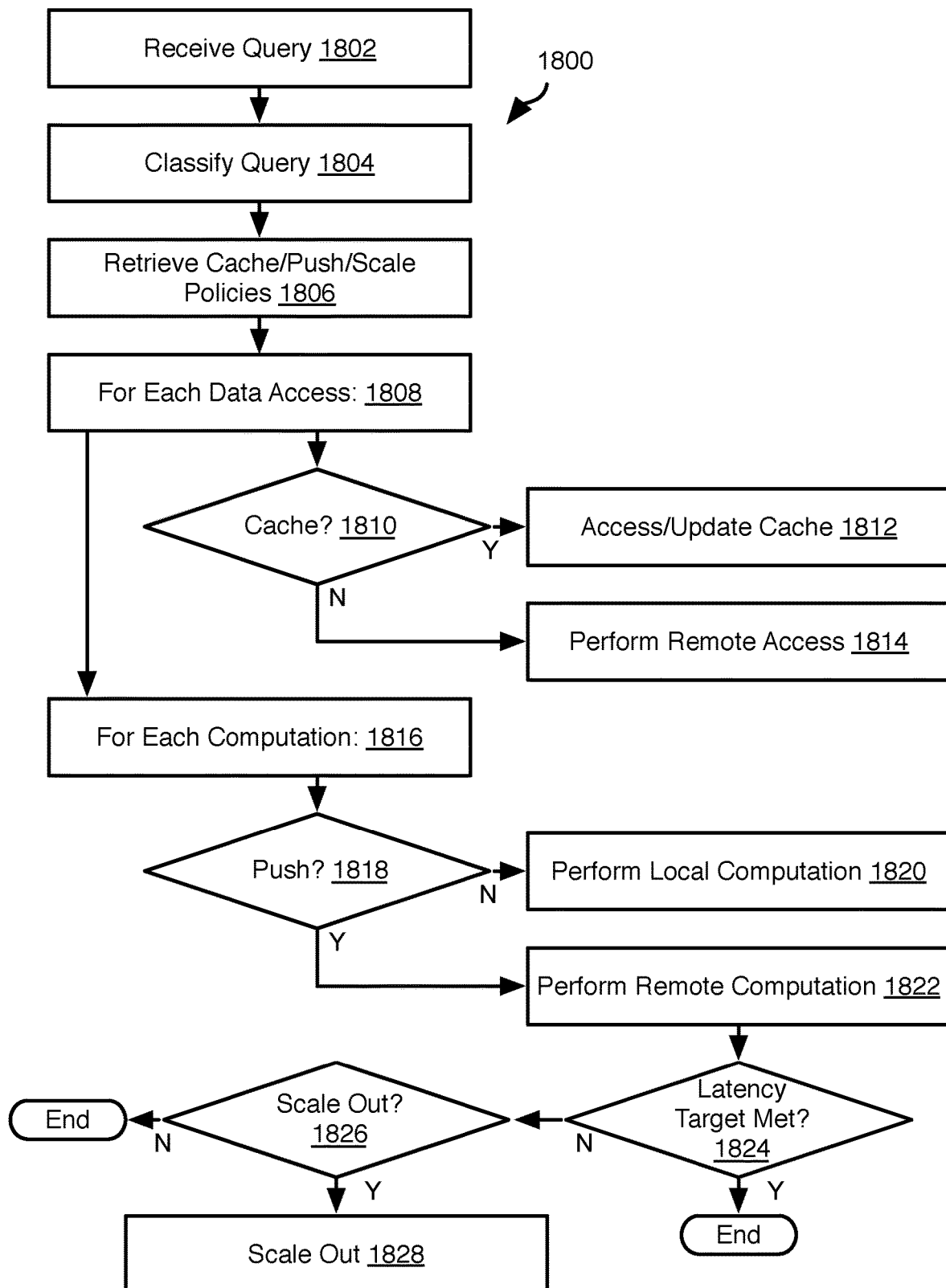
FIG. 18 is a process flow diagram of a method for implementing policies for achieving an expected performance in accordance with an embodiment of the present invention.

FIG. 18 illustrates a method 1800 for processing queries according to policies 1604-1608 and classifications according to the method 1700. The method 1800 may be executed by the tuning module 1600.

The method 1800 may include receiving 1802 a query and classifying 1804 the query. In particular, this may include determining a context that issued the query, e.g., a user account, application, workflow, workspace, or other division defining a context in which the query was issued. A classification for that context as defined according to the method 1700 may then be retrieved. As noted above, a classification may be based on attributes (data volume, complexity) of the query itself as noted above. Classification could also be performed manually, e.g., a user tagging a query with a classification. The method 1800 may further include retrieving 1806 policies 1604-1608 assigned to that classification.

For each data access of the query, the method 1800 may include performing 1808 an evaluation 1810 whether data referenced by the data access is or is specified to be cached 1810. In particular, the engine 104 may cache data according to the cache policy 1606. Caching may be performed prior to receiving a query or may be performed upon receiving a first query with respect to data that is permitted or required to be cached according to the cache policy 1606, e.g. data from a source that is to be cached according to the cache policy 1606.

If the data is found 1810 to be cached, then the data access may be performed 1812 with respect to the cached data. The cached data may also be updated as part of the access or in response to detecting a change in the version of the cached data in the source from which it was retrieved. Evaluating of whether a cached table is different from the version of the table at the source from which it is retrieved may be performed prior to data access, periodically, or in response to detecting writing of data to that table on the source.

In order to detect changes, a hash may be calculated of a table as stored at the source and compared to a hash of that table as cached on the local computing platform P. If the hashes differ, the table as stored on the source may be reloaded into the cache on the local computing platform P. Note that the hash function used in such cases may be a cryptographic hash rather than a locality-sensitive hash (e.g. MD5, SHA-1, or the like). In other examples, the "hash" of the source and cache versions of the table may be substituted with another characteristic of these tables, such as a Max/Count (maximum value in the table divided by number of values in the table) for these tables.

As noted above, various levels of caching may be specified in the cache policy 1606. Accordingly, the table is cached without indexing where so specified in the policy 1606 and is cached with indexing according to a key or column specified in the policy 1606 when so specified by the policy 1606.

In the event that caching is not permitted according to the cache policy 1606 for the classification from step 1804, the method 1800 may include performing 1814 a remote data access from the source without caching.

For the query from step 1802, the method 1800 may include performing 1816 for each computational operation (join, aggregation, etc.), evaluating 1818 the push policy 1604 for the classification from step 1804. If the push policy 1604 for the source of data referenced by the operation and the classification from step 1804 indicates that the computation should be pushed to the source of the data referenced by the operation, then this is performed at step 1822. Otherwise, the operation is performed 1820 locally, e.g. on the local computing platform P.

If the policy 1604 permits pushing to a remote computing platform, the method 1800 may further include evaluating whether operations performed by the remote computing platform are meeting 1824 latency targets. For example, the scale out policy 1608 for the remote computing platform may specify a latency target. If this target is found 1824 not to be met by the processing of one or more operations, the method 1800 may include evaluating 1826 whether scaling out of the remote computing platform is permitted according to the scale out policy 1608 that applies to the remote computing platform and the classification from step 1804. For example, this may include evaluating 1608 whether current computing resources allocated on the remote computing platform is at a maximum permitted amount or whether the latency meets a condition at which scale out is to be performed as specified by the scale out policy 1608. If so, then the remote computing platform is scaled 1828 out and additional computing and/or storage resources are requested (e.g., purchased) for use.

Figure 19:
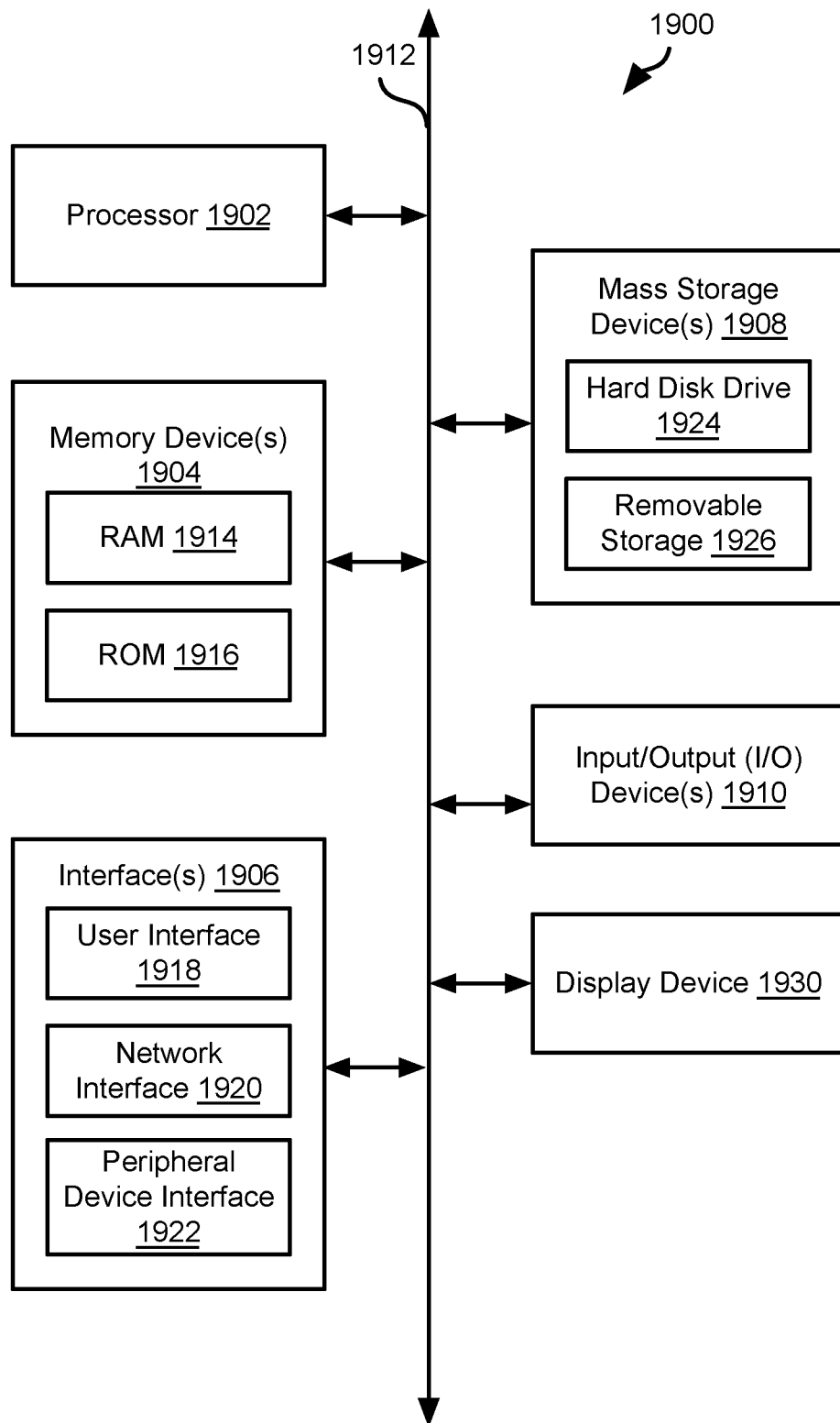
FIG. 19 is a schematic block diagram of a computer system in accordance with the prior art for implementing systems and methods in accordance with an embodiment of the present invention.

FIG. 19 is a block diagram illustrating an example computing device 1900. Computing platforms 102a-102c, interfaces 108a-108c, or other computing devices for implementing systems and methods as described above may have some or all of the attributes of the illustrated computing device 1900. In some embodiments, a cluster of computing devices interconnected by a network may be used to implement any one or more components of the invention.

Computing device 1900 may be used to perform various procedures, such as those discussed herein. Computing device 1900 can function as a server, a client, or any other computing entity. Computing device can perform various monitoring functions as discussed herein, and can execute one or more application programs, such as the application programs described herein. Computing device 1900 can be any of a wide variety of computing devices, such as a desktop computer, a notebook computer, a server computer, a handheld computer, tablet computer and the like.

Computing device 1900 includes one or more processor(s) 1902, one or more memory device(s) 1904, one or more interface(s) 1906, one or more mass storage device(s) 1908, one or more Input/output (I/O) device(s) 1910, and a display device 1930 all of which are coupled to a bus 1912. Processor(s) 1902 include one or more processors or controllers that execute instructions stored in memory device(s) 1904 and/or mass storage device(s) 1908. Processor(s) 1902 may also include various types of computer-readable media, such as cache memory.

Memory device(s) 1904 include various computer-readable media, such as volatile memory (e.g., random access memory (RAM) 1914) and/or nonvolatile memory (e.g., read-only memory (ROM) 1916). Memory device(s) 1904 may also include rewritable ROM, such as Flash memory.

Mass storage device(s) 1908 include various computer readable media, such as magnetic tapes, magnetic disks, optical disks, solid-state memory (e.g., Flash memory), and so forth. As shown in FIG. 19, a particular mass storage device is a hard disk drive 1924. Various drives may also be included in mass storage device(s) 1908 to enable reading from and/or writing to the various computer readable media. Mass storage device(s) 1908 include removable media 1926 and/or non-removable media.

I/O device(s) 1910 include various devices that allow data and/or other information to be input to or retrieved from computing device 1900. Example I/O device(s) 1910 include cursor control devices, keyboards, keypads, microphones, monitors or other display devices, speakers, printers, network interface cards, modems, lenses, CCDs or other image capture devices, and the like.

Display device 1930 includes any type of device capable of displaying information to one or more users of computing device 1900. Examples of display device 1930 include a monitor, display terminal, video projection device, and the like.

Interface(s) 1906 include various interfaces that allow computing device 1900 to interact with other systems, devices, or computing environments. Example interface(s) 1906 include any number of different network interfaces 1920, such as interfaces to local area networks (LANs), wide area networks (WANs), wireless networks, and the Internet. Other interface(s) include user interface 1918 and peripheral device interface 1922. The interface(s) 1906 may also include one or more user interface elements 1918. The interface(s) 1906 may also include one or more peripheral interfaces such as interfaces for printers, pointing devices (mice, track pad, etc.), keyboards, and the like.

Bus 1912 allows processor(s) 1902, memory device(s) 1904, interface(s) 1906, mass storage device(s) 1908, and I/O device(s) 1910 to communicate with one another, as well as other devices or components coupled to bus 1912. Bus 1912 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 1900, and are executed by processor(s) 1902. Alternatively, the systems and procedures described herein can be implemented in hardware, or a combination of hardware, software, and/or firmware. For example, one or more application specific integrated circuits (ASICs) can be programmed to carry out one or more of the systems and procedures described herein.

What is claimed is:

1. A method comprising:
   providing a plurality of database computing platforms coupled to one another by a network, each database computing platform having a corresponding database hosted by the each database computing platform;
   providing a premise computing platform coupled to the plurality of database computing platforms;
   receiving, by the premise computing platform, a performance target;
   defining, by the premise computing platform, a query processing distribution between the premise computing platform and the plurality of database computing platforms estimated to achieve the performance target according to a query performance model for the plurality of database computing platforms;
receiving, by the premise computing platform, a first query;
processing, by the premise computing platform, the first query with respect to the plurality of database computing platforms according to the query processing distribution;
adjusting, by the premise computing platform the query processing distribution to obtain an adjusted processing distribution in response to at least one of user feedback, a policy defined for the plurality of database computing platforms, and measured performance of the first query with respect to the plurality of database computing platforms;
receiving, by the premise computing platform, a second query; and
processing, by the premise computing platform, the second query with respect to the plurality of database computing platforms according to the adjusted processing distribution;
wherein the performance is a first performance target and the query processing distribution is a first query processing distribution;
wherein the method further comprises:
receiving, by the premise computing platform, a plurality of classifications, each having a performance target associated therewith, the first performance target being associated with one of the plurality of classifications;
determining, by the premise computing platform, a classification of the first query; and
identifying, by the premise computing platform, the first performance target as being associated with the classification of the first query; and
wherein determining the classification of the first query comprises:
identifying, by the premise computing platform, a source of the first query; and
identifying, by the premise computing platform, a classification associated with the source of the first query;
wherein the source of the first query is at least one of a user, application, workflow, or interface.

2. The method of claim 1, wherein the query performance model relates estimated performance parameters for an input distribution, the input distribution defining which of the premise computing platform and the plurality of database computing platforms performs operations of a query.

3. The method of claim 2, wherein the estimated performance parameters include: latency, network data transmitted, processing time used, and memory used.

4. The method of claim 1, wherein the query processing distribution defines, for a first database computing platform of the plurality of database computing platforms, a computation location for an operation, the computation location being one of the first database computing platform and the premise computing platform.

5. The method of claim 1, wherein the query processing distribution defines, for a first database computing platform of the plurality of database computing platforms, a data configuration for a table referenced by an operation and stored in the first database computing platform, the data configuration being one of accessing the table on the first database computing platform and caching the table on the premise computing platform.

6. The method of claim 1, further comprising:
evaluating, by the premise computing platform, actual performance of the first query when executed by the premise computing platform with respect to the plurality of database computing platforms;
determining, by the premise computing platform, that the actual performance did not meet the performance target;
in response to determining that the actual performance did not meet the performance target, scaling up allocation of a resource on at least one of the plurality of database computing platforms referenced by the first query.

7. The method of claim 6, wherein the resource is at least one of processing capacity and storage capacity.

8. The method of claim 1, defining, by the premise computing platform, the query processing distribution comprises defining the query processing distribution according to both of the query performance model and one or more policy constraints.

9. A system comprising:
a premise computing platform comprising one or more computing devices each including one or more processing devices and one or more memory devices operably coupled to the one or more processing devices, the premise computing platform being coupled to a plurality of database computing platforms, the premise computing platform being programmed to:
receive a performance target;
define a query processing distribution between the premise computing platform and the plurality of database computing platforms estimated to achieve the performance target according to a query performance model for the plurality of database computing platforms;
receive a first query; and
process the first query with respect to the plurality of database computing platforms according to the query processing distribution;
adjust the query processing distribution to obtain an adjusted processing distribution in response to at least one of user feedback, a policy defined for the plurality of database computing platforms, and measured performance of the first query with respect to the plurality of database computing platforms;
receive a second query; and
process the second query with respect to the plurality of database computing platforms according to the adjusted processing distribution;
wherein the performance is a first performance target and the query processing distribution is a first query processing distribution;
wherein the premise computing platform is further programmed to:
receive a plurality of classifications, each having a performance target associated therewith, the first performance target being associated with one of the plurality of classifications;
determine a classification of the first query; and
identify the first performance target as being associated with the classification of the first query; and
wherein the premise computing platform is further programmed to determine the classification of the first query by:
identifying a source of the first query; and
identifying a classification associated with the source of the first query;
wherein the source of the first query is at least one of a user, application, workflow, or interface.

10. The system of claim 9, wherein the query performance model relates estimated performance parameters for an input distribution, the input distribution defining which of the premise computing platform and the plurality of database computing platforms performs operations of a query.

11. The system of claim 10, wherein the estimated performance parameters include: latency, network data transmitted, processing time used, and memory used.

12. The system of claim 9, wherein the query processing distribution defines, for a first database computing platform of the plurality of database computing platforms, a computation location for an operation, the computation location being one of the first database computing platform and the premise computing platform.

13. The system of claim 9, wherein the query processing distribution defines, for a first database computing platform of the plurality of database computing platforms, a data configuration for a table referenced by an operation and stored in the first database computing platform, the data configuration being one of accessing the table on the first database computing platform and caching the table on the premise computing platform.

14. The system of claim 9, wherein the premise computing platform is further programmed to:
   evaluate actual performance of the first query when executed by the premise computing platform with respect to the plurality of database computing platforms;
   determine that the actual performance did not meet the performance target;
   in response to determining that the actual performance did not meet the performance target, scale up allocation of a resource on at least one of the plurality of database computing platforms referenced by the first query.

15. The system of claim 14, wherein the resource is at least one of processing capacity and storage capacity.

16. The system of claim 9, wherein the premise computing platform is further programmed to define the query processing distribution by defining the query processing distribution according to both of the query performance model and one or more policy constraints.

* * * * *